(12) United States Patent
LaMonica

(10) Patent No.: US 8,073,880 B2
(45) Date of Patent: Dec. 6, 2011

(54) SYSTEM AND METHOD FOR OPTIMIZING STORAGE INFRASTRUCTURE PERFORMANCE

(75) Inventor: Gregory Joseph LaMonica, Avon, CT (US)

(73) Assignee: Computer Associates Think, Inc., Islandia, NY (US)

( * ) Notice: Subject to any disclaimer, the term of this patent is extended or adjusted under 35 U.S.C. 154(b) by 315 days.

(21) Appl. No.: 11/938,534

(22) Filed: Nov. 12, 2007

(65) Prior Publication Data

US 2008/0114792 A1    May 15, 2008

Related U.S. Application Data

(60) Provisional application No. 60/865,343, filed on Nov. 10, 2006.

(51) Int. Cl.
*G06F 17/30* (2006.01)
(52) U.S. Cl. ...................................................... 707/812
(58) Field of Classification Search .................. 707/100, 707/205, 999.101, 999.205, 634, 694, E17.032, 707/650, 812
See application file for complete search history.

(56) References Cited

U.S. PATENT DOCUMENTS

| | | | |
|---|---|---|---|
| 5,233,513 A | 8/1993 | Doyle | 354/401 |
| 5,960,420 A | 9/1999 | Leymann et al. | 707/1 |
| 5,974,392 A | 10/1999 | Endo | 705/8 |
| 6,256,773 B1 | 7/2001 | Bowman-Amuah | 717/1 |
| 6,278,977 B1 | 8/2001 | Agrawal et al. | 705/7 |
| 6,308,162 B1 | 10/2001 | Ouimet et al. | 705/7 |
| 6,424,979 B1 | 7/2002 | Livingston et al. | 707/511 |
| 6,519,571 B1 | 2/2003 | Guheen et al. | 705/14 |
| 6,519,642 B1 | 2/2003 | Olsen et al. | 709/227 |
| 6,662,355 B1 | 12/2003 | Caswell et al. | 717/103 |
| 6,876,993 B2 | 4/2005 | LaButte et al. | 706/47 |
| 6,895,382 B1 | 5/2005 | Srinivasan et al. | 705/7 |
| 6,895,403 B2 | 5/2005 | Cardwell et al. | 707/10 |
| 6,959,268 B1 | 10/2005 | Myers Jr. et al. | 703/6 |
| 6,990,482 B1 | 1/2006 | Piotrowski et al. | 707/3 |
| 7,035,809 B2 | 4/2006 | Miller et al. | 705/8 |
| 7,069,179 B2 | 6/2006 | Kim et al. | 702/182 |
| 7,069,234 B1 | 6/2006 | Cornelius et al. | 705/26 |
| 7,197,520 B1 * | 3/2007 | Matthews et al. | 707/204 |
| 7,290,275 B2 | 10/2007 | Baudoin et al. | 726/1 |
| 7,315,826 B1 | 1/2008 | Guheen et al. | 705/7 |

(Continued)

OTHER PUBLICATIONS

"Delivering Intelligence for Business Value and Insight", Copyright 2002 Computer Associates International, Inc., MP160920902, 4 pages.

(Continued)

*Primary Examiner* — James Trujillo
*Assistant Examiner* — Soheila Davanlou
(74) *Attorney, Agent, or Firm* — Pillsbury Winthrop Shaw Pittman LLP

(57) ABSTRACT

The invention provides a system and method for integrated, optimized data storage infrastructure performance in a distributed computing environment using a storage resource management application. The invention may include a storage resource management application that receives and stores data regarding one or more infrastructure components of a distributed computing environment. A request related to performance of a data storage infrastructure of the distributed computing environment, may then be received. A request type may then be identified from one or more predefined request types. Examples of request types may include new asset addition requests, data storage provisioning requests, performance review requests, reporting requests, backup/recovery requests, and/or other requests. One or more infrastructure components, management agents, and/or service level agreements are then identified and associated with the request.

21 Claims, 31 Drawing Sheets

U.S. PATENT DOCUMENTS

| | | | | |
|---|---|---|---|---|
| 7,350,138 | B1* | 3/2008 | Swaminathan et al. | 715/234 |
| 7,421,617 | B2* | 9/2008 | Anderson et al. | 714/15 |
| 7,447,729 | B1 | 11/2008 | Thakur et al. | 709/200 |
| 7,703,070 | B2 | 4/2010 | Bisceglia | 717/101 |
| 7,734,594 | B2* | 6/2010 | Wang | 707/644 |
| 7,747,577 | B2* | 6/2010 | Cannon et al. | 707/650 |
| 7,752,070 | B2 | 7/2010 | Hatcher et al. | 705/11 |
| 7,752,437 | B1* | 7/2010 | Thakur et al. | 713/165 |
| 2001/0052108 | A1 | 12/2001 | Bowman-Amuah | 717/1 |
| 2002/0029319 | A1* | 3/2002 | Robbins et al. | 711/114 |
| 2002/0065696 | A1 | 5/2002 | Hack et al. | 705/7 |
| 2002/0065698 | A1 | 5/2002 | Schick et al. | 705/8 |
| 2002/0144256 | A1 | 10/2002 | Budhiraja et al. | 717/174 |
| 2002/0174045 | A1 | 11/2002 | Arena et al. | 705/36 |
| 2002/0188927 | A1 | 12/2002 | Bellagamba | 717/101 |
| 2003/0093521 | A1 | 5/2003 | Schlonski et al. | 709/224 |
| 2003/0110067 | A1 | 6/2003 | Miller et al. | 705/8 |
| 2003/0171976 | A1 | 9/2003 | Farnes et al. | 705/10 |
| 2003/0172020 | A1 | 9/2003 | Davies et al. | 705/36 |
| 2003/0216926 | A1 | 11/2003 | Scotto et al. | 705/1 |
| 2004/0010709 | A1 | 1/2004 | Baudoin et al. | 713/201 |
| 2004/0015377 | A1 | 1/2004 | Hostetler | 705/7 |
| 2004/0039619 | A1 | 2/2004 | Zarb | 705/7 |
| 2004/0054545 | A1 | 3/2004 | Knight | 705/1 |
| 2004/0078654 | A1* | 4/2004 | Holland et al. | 714/13 |
| 2004/0093244 | A1 | 5/2004 | Hatcher et al. | 705/7 |
| 2004/0107125 | A1 | 6/2004 | Guheen et al. | 705/7 |
| 2004/0193476 | A1 | 9/2004 | Aerdts | 705/10 |
| 2004/0225549 | A1 | 11/2004 | Parker et al. | 705/8 |
| 2005/0043976 | A1 | 2/2005 | Leehman | 705/7 |
| 2005/0108043 | A1 | 5/2005 | Davidson | 705/1 |
| 2005/0114829 | A1 | 5/2005 | Robin et al. | 717/101 |
| 2005/0120032 | A1 | 6/2005 | Liebich et al. | 707/100 |
| 2005/0125272 | A1 | 6/2005 | Hostetler | 705/7 |
| 2005/0159973 | A1 | 7/2005 | Krause et al. | 705/1 |
| 2005/0267771 | A1 | 12/2005 | Biondi et al. | 705/1 |
| 2006/0045039 | A1* | 3/2006 | Tsuneya et al. | 370/318 |
| 2006/0064481 | A1 | 3/2006 | Baron et al. | 709/224 |
| 2006/0069540 | A1 | 3/2006 | Krutz | 703/22 |
| 2006/0080656 | A1 | 4/2006 | Cain et al. | 717/174 |
| 2006/0117012 | A1 | 6/2006 | Rizzolo et al. | 707/9 |
| 2006/0161883 | A1 | 7/2006 | Lubrecht et al. | 717/104 |
| 2007/0021967 | A1 | 1/2007 | Jaligama et al. | 705/1 |
| 2007/0027734 | A1 | 2/2007 | Hughes | 705/7 |
| 2007/0043538 | A1 | 2/2007 | Johnson et al. | 702/188 |
| 2007/0061180 | A1 | 3/2007 | Offenberg | 705/8 |
| 2007/0061191 | A1 | 3/2007 | Mehrotra et al. | 705/11 |
| 2007/0100892 | A1* | 5/2007 | Kephart et al. | 707/200 |
| 2007/0101167 | A1* | 5/2007 | Lindley et al. | 713/300 |
| 2008/0086357 | A1 | 4/2008 | Choubey et al. | 705/10 |
| 2008/0114700 | A1 | 5/2008 | Moore et al. | 705/36 R |
| 2010/0114833 | A1* | 5/2010 | Mu | 707/650 |

OTHER PUBLICATIONS

Mehrotra, Vibhav, "Growing into Release Management via an Iterative Approach", Emphasis on Enterprise, *Programmer's Paradise Magazine*, Apr. 2005, pp. 24-25.

Clarke, Angela, et al., "The Development of a Best Practice Model for Change Management", *European Management Journal*, vol. 15, No. 5, 1997, pp. 537-545.

Knodel, Ted, "Preparing the Organizational 'Soil' for *Measurable and Sustainable* Change: Business Value Management and Project Governance", *Journal of Change Management*, vol. 4, No. 1, Mar. 2004 (received Jun. 2003), pp. 45-62.

Schmid, Ph.D., Hillel, "Relationships Between Organizational Properties and Organizational Effectiveness in Three Types of Nonprofit Human Service Organizations", *Public Personnel Management*, vol. 31, No. 3, Fall 2002, ABI/INFORM Global, pp. 377-395.

"Prosci's Change Management Maturity Model™", Prosci, © 2004, pp. 1-8.

Nicholls, Mg, et al., "Using OR for Diagnosis and Facilitation in Change Programmes: a University Application", *Journal of the Operational Research Society*, vol. 55, 2004, pp. 440-452.

Kakita, Howard H., et al., "Improving Process Maturity to Compete in the Desktop Printer Market", *PDMA Visions Magazine*, Apr. 1998, pp. 1-8.

Clarke, Nick, "Asset Management and Monitoring", Tessella Support Services PLC, Issue V1.R0.M1, Oct. 2005, 21 pages.

Anonymous, "Enterprise Asset Management Systems", *Work Study*, vol. 51, No. 6/7, ABI/INFORM Global, 2002, pp. 320-328 (2 pages).

Paulk, Mark C., et al., "Capability Maturity Model, Version 1.1", IEEE Software, vol. 10, No. 4, Jul. 1993, pp. 18-27.

Diaz, Michael, et al., "How Software Process Improvement Helped Motorola", IEEE Software, vol. 14, No. 5, Sep./Oct. 1997, pp. 75-81.

Bosch, Jan, "Maturity and Evolution in Software Product Lines: Approaches, Artefacts and Organization", *Software Product Lines Lecture Notes in Computer Science*, 2002, vol. 2379/2002, pp. 257-271.

Paulk, Mark C., "Key Practices of the Capability Maturity Model", Software Engineering Institute, Carnegie Mellon University, Technical Report CMU/SEI-93-TR-025, Feb. 1993, 479 pages.

Herbsleb, James, et al., "Software Quality and the Capability Maturity Model" *Communications of the ACM*, vol. 40, No. 6, Jun. 1997, pp. 30-40.

* cited by examiner

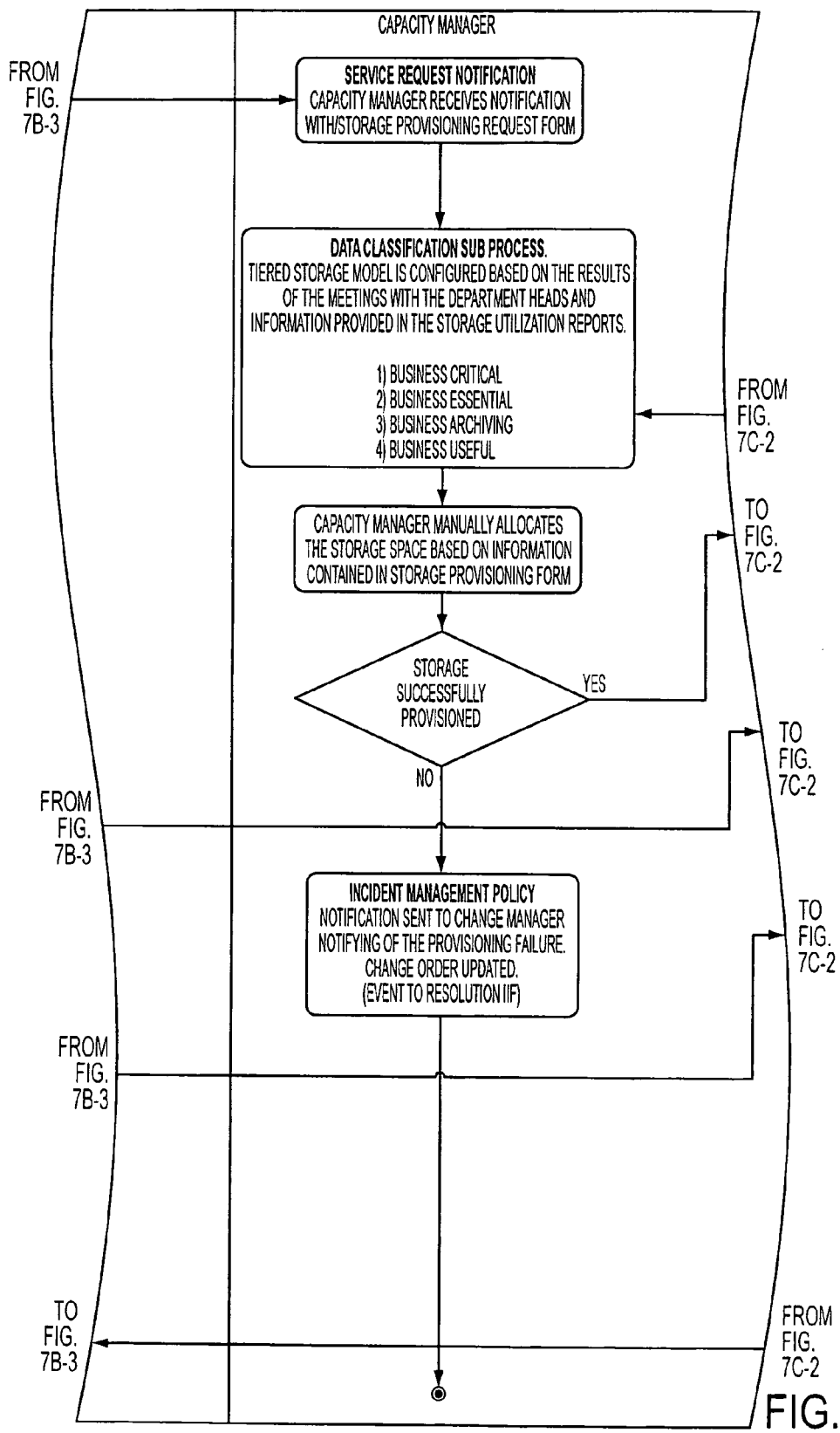

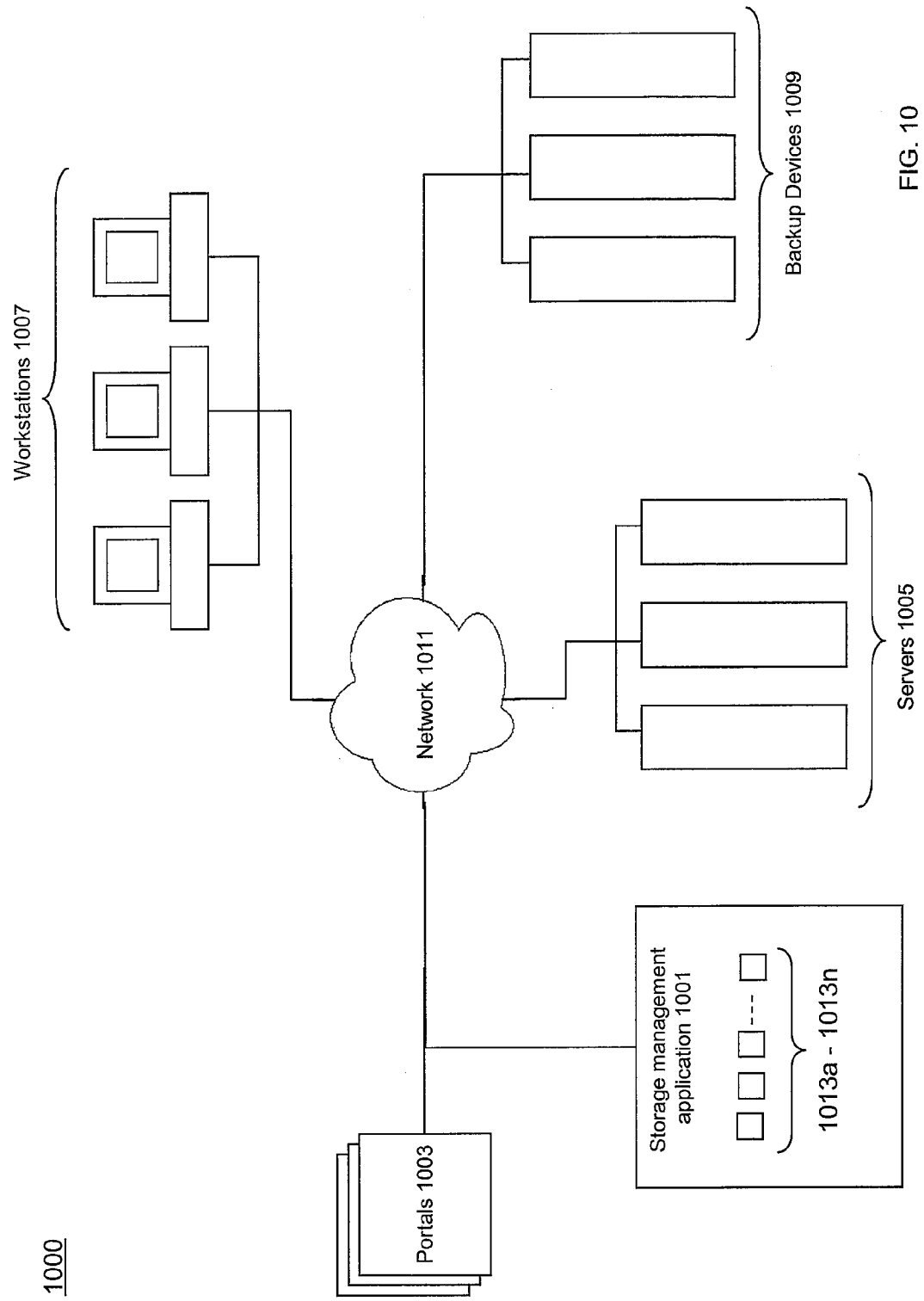

SYSTEM AND METHOD FOR OPTIMIZING STORAGE INFRASTRUCTURE PERFORMANCE

CROSS REFERENCE TO RELATED APPLICATIONS

This application claims the benefit of U.S. Provisional Patent Application No. 60/865,343, filed Nov. 10, 2006, which is hereby incorporated by reference herein in its entirety.

FIELD OF THE INVENTION

The invention generally relates to the field of data storage. More particularly, the invention relates to a method and system for optimizing computer data storage solutions in a distributed storage infrastructure.

BACKGROUND OF THE INVENTION

With the advent of distributed networks and the increase of communication speed between network elements, the amount and complexity of data used throughout networks has increased. These large, complex, computing environments often include a number of elements such as, for example, servers, routers, databases, mainframes, personal computers, intelligent agents, and business applications. The complex data used in these environments must be accessible through various aspects of the distributed networks. Furthermore, administrators of these networks require tools to manage stored data for performance of, for example, backup operations, security audits, data mining operations, or other features. To adequately manage and maintain such a vast amount of data, the various elements of the distributed network must be able to retrieve the data located on several different forms of storage medium.

A Storage Area Network (SAN) type infrastructure is an example of a complex distributed network. A SAN is a network that connects multiple servers and multiple storage devices. SAN operations include input to and output from various storage devices. A SAN, for example, may be configured such that various servers are allowed to access data located on various storage media (RAID, a DVD-RAM library, or other media) within subsections of the network. This access may be provided via local servers, LAN arrangements to storage elements, individual servers, and/or other network elements. A SAN realizes the sharing of various storage devices, high-speed data processing between servers and storage devices, and long distance connections between its elements.

One of the concerns regarding storage in SAN implemented enterprises is whether data stored on the storage devices is being managed properly to ensure data availability. Data availability requirements typically include ensuring that the data is available to the applications that need it, when they need it, and with quality of service requirements being met. In addition, administrators need to evaluate the level of available storage capacity and the level of usage for elements and storage units in the enterprise. Significant storage-related expenditures of an enterprise make storage management a critical part of running the enterprise. One of the main reasons for high management costs is that managing storage (and ensuring data availability) requires a comprehensive and diverse set of tools, which generally present a further management challenge. Conventional storage management tools typically have different strengths and weaknesses and often provide different views of the same limited set of information.

Furthermore, the multiple management tools necessary to successfully manage a distributed environment are not available in the form of an integrated solution such as, for example, one offered or serviced by a single vendor. Accordingly, conventional storage management tools do not perform well with one another throughout the entirety of a distributed network. Specifically, while there may be many different management products available, most if not all do not work well together and do not appear to have a common goal in mind (i.e., maximizing the performance of a storage infrastructure by enabling an end user to perform and automate tasks that need to be completed on a daily basis in order to effectively manage a storage environment).

To overcome these and other shortcomings of conventional storage management systems, the invention provides comprehensive systems and methods that optimize complex data storage environments by providing tools allowing for data protection and classification to best suit the needs of an enterprise.

SUMMARY OF THE INVENTION

In some embodiments, the invention provides systems and methods for improved management of data storage environments. In some embodiments, the management capabilities of the invention may be used to ensure compliance with corporate policies, government regulations, or other data storage guidelines and best practices. In some embodiments, the systems and methods of the invention may enable users (e.g., an information technology operations manager) to discover, identify, classify and protect stored data. Furthermore, the invention enables identification of inefficiently used resources, definition and management of an optimal storage environment that is adaptable to business needs, automation of processes and storage related tasks, and other features.

In some embodiments, the invention includes a process for implementing a centrally managed storage management infrastructure within a distributed storage and computing environment (a "distributed computing environment"). Initially, a storage management application of the storage management infrastructure may gather or discover information regarding the existing storage-related hardware and software resources of an organization (i.e. the infrastructure components of the distributed computing environment, which may include hardware elements, software elements, or other elements of the distributed computing environment). The information relating to storage resources/infrastructure components may be stored in a central management database (CMDB) associated with the storage management application. The CMDB may serve as centrally accessible data store for storage management information regarding the distributed computing environment.

A storage-related request may then be received by the storage management application from somewhere within the distributed computing environment. The type of storage related request is then determined. In one implementation, a plurality of different predefined request types may be accessed by the storage management application. In one embodiment, these storage-related request types may include: a new asset addition request (i.e., one or more new storage components—hardware, software, or other component—is being added to the distributed computing environment); a storage provisioning request (i.e., part of or an element on the distributed computing system is requesting storage resources); a storage performance review request (i.e., a review or audit of the performance of the storage resources/infrastructure components of the distributed computing system in their current configuration); a report request (i.e., a request to produce a report regarding one or more metrics or other characteristics associated with part or all of the storage resources/infrastructure components in the distributed computing environment), or a backup/recovery request (i.e., a request to recover, from backup/redundant storage resources/infrastructure components, material that was damaged or otherwise lost from other storage resources or infrastructure components). Other types of storage-related requests may also be defined, received, and acted upon in the invention.

Depending on the type of storage-related request discerned, information gathering and/or specific action may take place after the request type determination. For example, in some embodiments, one or more infrastructure components of the distributed computing infrastructure associated with a request may be identified. In some embodiments, storage management application agents and/or service level agreements may be associated with the identified components.

The above operations describing storage-related requests are exemplary only. Other operations for similar requests may be performed, as well as operations for different storage-related requests, according to various embodiments of the invention. In some implementations, the operations recited above may be performed in a different order. In some implementations, not all operations may be necessary.

While the above description includes performance of processes in relation to a single storage management application, these and other features and functions of the invention may be performed and/or implemented in relation to multiple disparate or distributed modules or applications.

These and other objects, features, and advantages of the invention will be apparent through the detailed description and the drawings attached hereto. It is also to be understood that both the foregoing general description and the following detailed description are exemplary and not restrictive of the scope of the invention.

BRIEF DESCRIPTION OF THE DRAWINGS

FIGS. 6A-1 through 6B-2 illustrate an example of a process flow diagram for an Active storage management maturity level, according to various embodiments of the invention.

FIGS. 7A-1 through 7C-2 illustrate an example of a process flow diagram for an Efficient storage management maturity level, according to various embodiments of the invention.

FIGS. 8A-1 through 8C-2 illustrate an example of a process flow diagram for a Responsive storage management maturity level, according to various embodiments of the invention.

FIGS. 9A-1 through 9C2 illustrate an example of a process flow diagram for an Business-Driven storage management maturity level, according to various embodiments of the invention.

FIG. 10 illustrates an example of a system diagram for a system for improved storage management, according to various embodiments of the invention.

DETAILED DESCRIPTION

As discussed above, traditional storage management involves utilizing one or more disparate and relatively incompatible software tools/applications. In many cases, these disparate tools fail to alleviate the storage-related challenges presented by an organization's complex distributed network systems. Furthermore, these challenges may not be the same or similar across all organizations, and each organization may require a unique set of solutions to optimize storage management. As such, there exists a need for systems and methods for assessing the status of an organization's storage management infrastructure, producing a proposed scheme for improving the organization's storage management infrastructure, and deploying that scheme to implement an interactive and centrally accessible storage management infrastructure. Not only does the invention enable simpler management of storage environments, but may also be used to ensure compliance with corporate policies, government regulations, or other data storage guideline and best practices.

The systems and methods of the invention enable users (e.g., an information technology operations manager) to discover, identify, classify and protect stored data. Furthermore, the invention enables identification of inefficiently used resources, definition and management of an optimal storage environment that is adaptable to business needs, automation of processes and storage related tasks, and other features.

Figure 1:
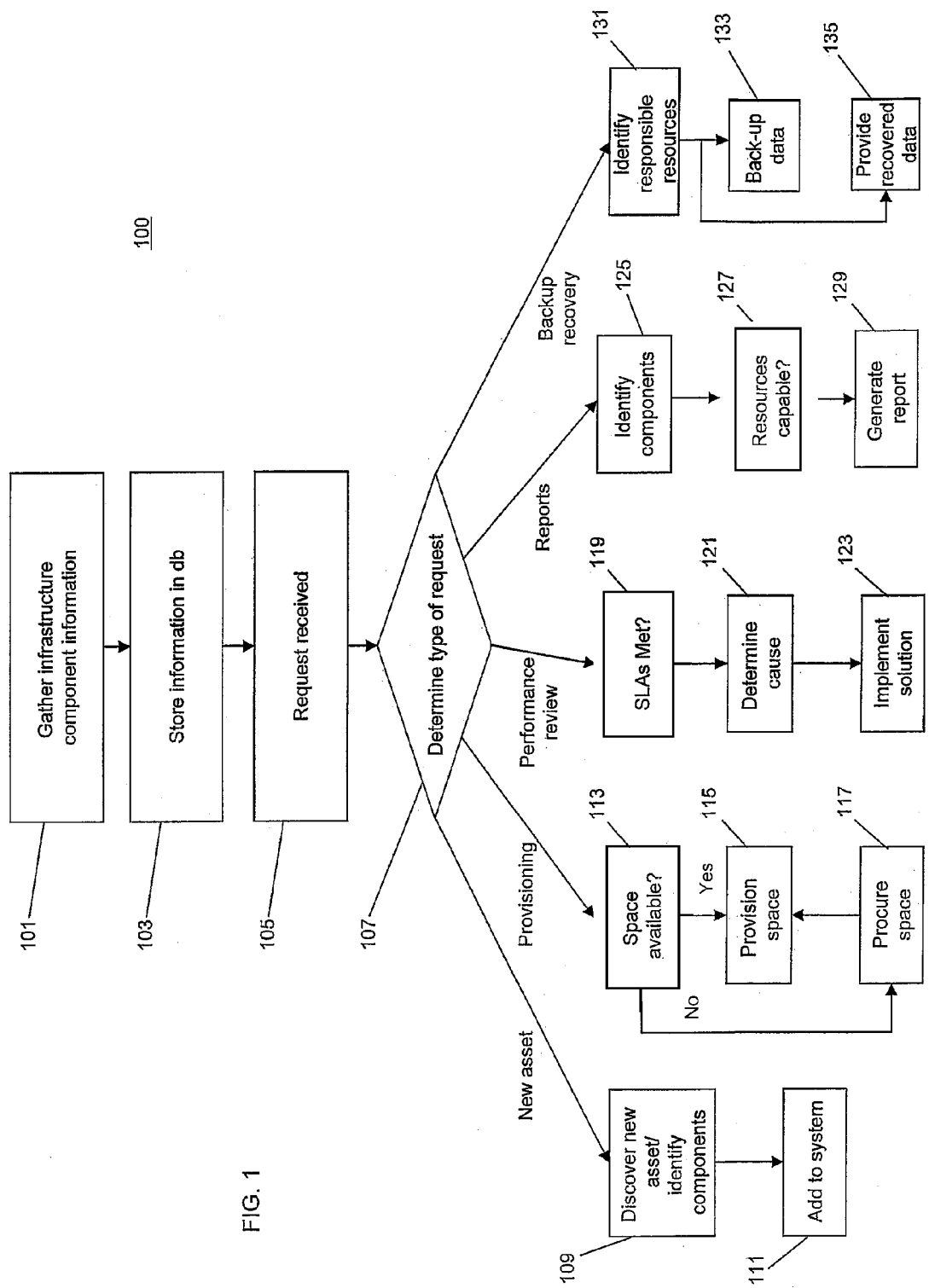
FIG. 1 illustrates an example of a process for improved storage management, according to various embodiments of the invention.

FIG. 1 illustrates a process 100, which is an example of a process for implementing a centrally managed storage management infrastructure within a distributed storage and computing system. In an operation 101, a storage management application may gather, discover, and/or receive information regarding the existing infrastructure components (e.g., hardware and software resources) of an organization's distributed computing environment. In one implementation, an automated discovery module of the storage management application may scan, poll, or otherwise search the distributed computing environment to identify such infrastructure components that are available for distributed storage. In one implementation, a portal associated with the storage management application such as, for example, a web portal, may be used to gather information regarding infrastructure components. In some embodiments, the portal may gather this information from manual or "human" sources (e.g., an administrator typing the information into a graphical user interface provided by the portal). In some embodiments, the information may be gathered via an automated source (e.g., the automated discovery module or individual reporting modules of individual resources may access the portal and feed storage related information into a storage management database). In an operation 103, the information relating to infrastructure components may be stored in a storage management database associated with the storage management application. The storage management database may serve as centrally accessible data store for storage management information regarding the distributed computing environment.

In an operation, 105, a storage-related request may be received by the storage management application from within the distributed computing infrastructure. In one implementation, the storage-related request is received through a portal associated with the storage management application. In one embodiment, the portal may be the same or similar to the portal through which storage resource information was gathered (e.g., web portal; from manual source; from automated source).

In an operation 107, the type of storage related request is determined. In one implementation a plurality of different predefined request types that may known to the storage management application. In one embodiment, these storage-related request types may include: a new asset addition request (i.e., one or more new storage components—hardware, software, or other components—are being added to the distributed computing environment); a storage provisioning request (i.e., part of or an element on the distributed computing environment is requesting storage resources); a storage performance review request (i.e., a review or audit of the performance of the storage resources/components of the distributed computing environment in their current configuration); a report request (i.e., a request to produce a report regarding one or more metrics or other characteristics associated with part or all of the storage resources/components in the distributed computing environment), or a backup/recovery request (i.e., a request to recover, from backup/redundant storage resources/components, information that was damaged or otherwise lost from other storage resources/components). Other types of storage-related requests may also be defined, received, and acted upon in the invention.

Depending on the type of storage-related request discerned in operation 107, information gathering and/or specific action may take place after the request type determination. For example, if the request were determined to be a new asset request, a change manager or other entity within the organization may initiate a discovery process in an operation 109 to discover the one or more components of the new asset and add the new asset to the distributed computing environment in an operation 111. In some embodiments, adding the new asset to the distributed computing environment may include, for example, associating the one or more components of the new asset with one or more storage management application agents or options to ensure the new asset will be managed by the storage management application. In some embodiments, space may be provided on the components of the new asset in order to install an application, database, or other elements, and to grant access to users. In some embodiments, adding the components of the new asset to the distributed computing environment may include associating the one or more components of the new storage asset with one or more departmental service level agreements, such that the new storage asset is monitored relative to one or more departmental service level agreements. The new asset may also be subject to periodic performance reviews and storage management application agent or option updates. One or more additional operations may also be performed relative to new asset addition requests.

If the request were determined to be a storage provisioning request, an asset manager or other entity may determine if storage space currently exists to accommodate the request in an operation 113. If enough space exists, the space is provisioned in an operation 115. If enough space does not exist, the asset manager initiates a procurement request to purchase or otherwise acquire the necessary resources in an operation 117.

In some embodiments, provisioning space (i.e. operation 115) in response to a storage provisioning request may include identifying the one or more infrastructure components associated with the provisioning request (e.g., those components associated with generating the request, those components associated with providing storage space). In some embodiments, operation 115 may also include associating the provisioned storage space or the one or more identified components with one or more storage management application agents or options. In some embodiments, operation 115 may also include associating the provisioned data storage space and/or the one or more identified components with one or more departmental service level agreements, such that the provisioned storage space is monitored relative to one or more departmental service level agreements. Other operations may be performed relative to storage provisioning requests such as, for example, installing applications, databases, and/or granting user access to provisioned storage. The provisioned storage may be subject to periodic performance reviews and storage management application agent or option updates.

If the request were determined to be a storage performance review request, a service level manager or other entity may review backup and recovery reports or other reports or information to determine in an operation 119 whether one or more service level agreements (SLAs) are being met. A service level agreement may be defined by a recovery point objective and a recovery time objective, which may be determined by any regulatory compliance issues. If one or more of the SLAs are not being met, the reason for the failure to meet the one or more SLAs may be determined in an operation 121, and a solution (e.g., new configuration) may be implemented in an operation 123 ensuring that the SLAs are being met. The review of information associated with a performance review request may include initially identifying one or more infrastructure components of the distributed computing environment associated with the performance review request (e.g., analyzing the resources for which performance review is requested).

If the request were a report request, the one or more infrastructure components of the distributed computing environment associated with the report request (e.g., what resources/components will be reported on?) are identified in an operation 125. In an operation 127, a storage administrator or other entity may ensure that the specific storage resources are able to generate the report. In an operation 129, a storage utilization and/or backup status reports is created and posted to a centralized management console for review (or otherwise make available to a user).

If the request were a backup/recovery request, the storage administrator or other entity may identify one or more infrastructure components associated with the request in an operation 131. This may include identifying the resources responsible for backing up the data at issue. If the request is a data back-up request, the storage asset (e.g., application, database, file system) is then backed up in accordance with a specified SLA in an operation 133. If the request is a recovery request, the data to be recovered may be sent to the appropriate components(s) in the distributed computing environment in accordance with a specified SLA in an operation 135. In some embodiments, the SLA's referenced in operations 133 and 135 may be specified in the request, may be associated with the resources/components of the computing environment, may be associated with the underlying data, or may be otherwise specified.

The above operations describing storage-related requests are exemplary only. Other operations for similar requests may be performed, as well as operations for other storage-related requests, according to various implementations of the invention. In some implementations, the operations recited above may be performed in a different order. In some implementations, not all operations may be necessary.

While the above description includes performance of processes in relation to a single storage management application, these and other features and functions of the invention may be performed and/or implemented in relation to multiple disparate or distributed applications.

In some implementations, the invention includes transitioning an organization through a hierarchy of data storage management maturity levels (e.g., Active, Efficient, Responsive, Business-driven) based on the business objectives of the organization. Transitioning through increasingly advancing maturity levels may aid an organization in: identifying and classifying networked storage assets; defining unique best practices for administering networked storage assets; taking the necessary actions to manage networked storage assets effectively, whether manually or automatically; and may provide other benefits. Additionally, transitioning an organization to a higher storage management maturity level enables the organization to implement a centrally managed storage management environment.

In one embodiment, improving storage management infrastructure and processes may initially involve defining a plurality of storage management maturity levels that are arranged in a hierarchy (e.g., maturity level 1, level 2, etc.). These maturity levels may each define a set of processes and/or other infrastructure for storage management within an organization operating at one of the plurality of maturity levels. These predefined maturity levels may be used in one or more ways as a guide for improving a real-world organization's storage management.

In one embodiment, the plurality of predefined storage management maturity levels may include, for example, an "Active" or level 1 maturity level, an "Efficient" or level 2 maturity level, a "Responsive" or level 3 maturity level, a "Business-driven" or level 4 maturity level, or other maturity levels. In some embodiments, these maturity levels may be organized as a hierarchy such as, for example, the Active maturity level being designated as the least developed or lowest maturity level, the Efficient maturity level being considered higher or more developed than the Active maturity level, the Responsive maturity level being considered higher or more developed than the Efficient maturity level, and the Business-Driven maturity level being designated as the highest or most developed maturity level. This hierarchical arrangement may reflect increasing levels of complexity, return on investment for the organization, or other qualities. These defined maturity levels and their arrangement in a hierarchy may provide a stepwise framework for advancing an organization's storage management. It should be noted that the labels "Active," "Efficient," "Responsive," and "Business-Driven" are examples only. Other labels representing any number of hierarchically organized maturity levels may be used.

Figure 2:
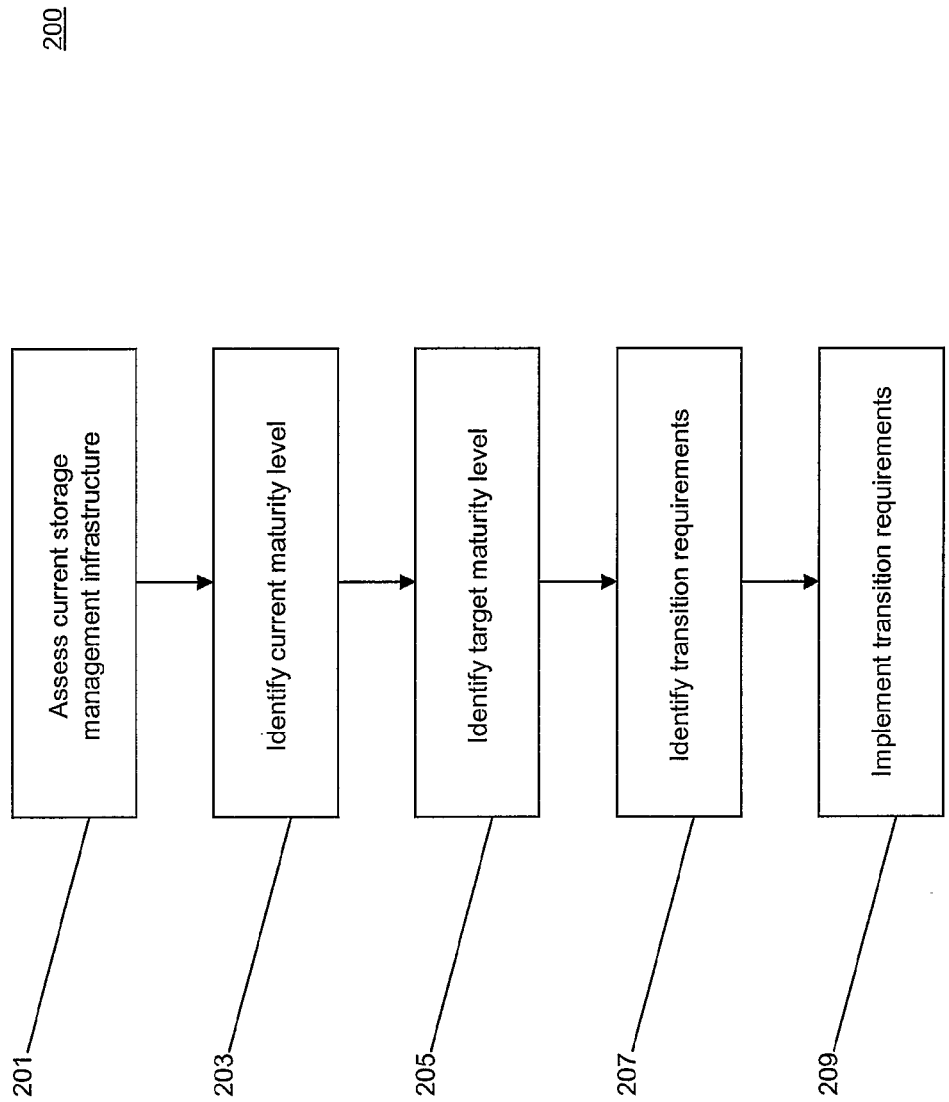
FIG. 2 illustrates an example of a process for improving an organization's storage management maturity level, according to various embodiments of the invention.

In one embodiment, the invention provides processes by which an organization's storage management maturity level may be assessed and improved. FIG. 2 illustrates a process 200, which is an example of a process for transitioning an organization through a hierarchy of data storage management maturity levels. Process 200 may include an operation 201, wherein the current storage management infrastructure of a target organization is assessed. This assessment includes an inventory of the hardware and software components involved in data storage and data storage management within the organization. The assessment of operation 201 also includes an assessment of how data storage is managed from storage requests all the way to deployment of resources that fulfill the requests.

Process 200 also includes an operation 203, wherein the current storage management infrastructure of the organization is categorized into one of a plurality of predefined, hierarchically-arranged storage management maturity levels (e.g., one of "Active," "Efficient," "Responsive," "Business-Driven," or other predefined maturity level). The maturity level in which the organization is categorized in operation 203 is the "current" storage management maturity level of the organization.

Once the current storage management maturity level of an organization is identified in an operation 203, a target storage management maturity level may be identified in an operation 205. In some embodiments, the "target" storage management maturity level may include the maturity level immediately above the current maturity level in the hierarchy. In other embodiments, the target maturity level may be two or more levels higher than the current storage management maturity level.

In an operation 207, a set of requirements necessary to transition the organization from the current storage management maturity level to a higher storage management maturity level is identified. This includes any components (e.g., human resources, hardware solutions, software solutions), processes, policies or other elements that will transition the organization to a higher maturity level. This includes recommending best practices process flows to achieve a higher storage management maturity level within the organization.

In an operation 209, the set of requirements identified in operation 207 are implemented within the organization and the organization is transitioned into the higher maturity level. Implementation of the requirements may be preformed by personnel or infrastructure internal to the organization, by external personnel or infrastructure (e.g., consultants or other service providers), or by a combination of both. In some implementations of the invention, additional operations may be performed to verify and or fine-tune an organization's transition to a higher maturity level.

In some implementations, the invention may include a defined set of one or more components, characteristics, milestones, hallmarks or other identifiers that define each of the plurality of storage management maturity levels. These identifiers may be utilized to recognize the current maturity level of an organization, to identify the set of requirements necessary to transition an organization from one maturity level to another, to verify such a transition, and/or for other purposes.

For example, in an implementation wherein the plurality of defined storage management maturity levels include "active," "efficient," "responsive," and "business-driven" maturity levels, an organization whose storage management maturity level is classified as "Active," may exhibit the following characteristics: the storage management policies, processes, and infrastructure of the organization are ad hoc and occasionally even chaotic; few processes are defined; success depends on individual effort and heroics; or other characteristics. Other characteristics may be used as identifiers of active or level 1 storage management maturity such as, for example, storage utilization reports may include spreadsheets, which are created manually and are used to track the system, application, and database utilization. Furthermore, additional storage assets may be unnecessarily purchased due to the fact that the manually created storage utilization reports may not be accurate or kept up to date. The process to add a new storage asset to the storage infrastructure is a manual process, and the current storage solutions do not have an automated discovery process.

An example of an organization whose storage management maturity level is considered "Efficient" may exhibit the following characteristics: well trained staff to manage their current storage infrastructure; automated storage asset discovery; a centralized, automated enterprise backup data storage system; a centralized automated data identification storage resource management system; periodic performance reviews of storage infrastructure; storage utilization performance review; storage provisioning; a system for classifying data and storing the data on the appropriate device; a storage infrastructure that is monitored; automated event management processes; defined, implemented, and maintained departmental service levels (a departmental service level may be defined by a recovery point objective and a recovery time objective, which may be defined by any regulatory compliance issues); implemented and tested disaster recovery plans; automated processes for delivering alerts in the event of a backup or system failure; and/or other characteristics. In one implementation of the invention, transitioning an organization from an active or level 1 maturity level to an efficient or level 2 maturity level may include implementing the characteristics of an efficient storage management organization identified above, and/or implementing other characteristics.

An example of an organization whose storage management maturity level is considered "Responsive" may exhibit the following characteristics in additional to some or all of the characteristics of an Efficient storage management maturity level (to the extent characteristics do not conflict): security audits are configured and performed on a daily basis on all user accounts and systems defined to the storage infrastructure; storage asset performance reviews are scheduled and executed based on defined departmental service levels; policy based recovery and storage management procedures; insuring that COOP (Continuity of Operation)—ISO (International Organization for Standardization)—SOX (Sarbanes Oxley) compliance is in place; a "C" level (e.g., CEO, CIO, CTO) management level command center for high level reporting and management; defined and implemented tiered storage structure; automated processes to collect and publish reports to a centralized management console; and/or other characteristics.

An example of an organization whose storage management maturity level is considered "Business-Driven" may exhibit the following characteristics in addition to some or all of the characteristics of a Efficient and/or Responsive storage management maturity level (to the extent that characteristics do not conflict): a unified business and information technology view; departmental chargeback system in place (storage assets tied directly back to the business); and/or a centralized database for applications (e.g., a central management database [CMDB] is now implemented). Other characteristics may be used as identifiers of Business-Driven or level 4 storage management maturity.

Figure 3:
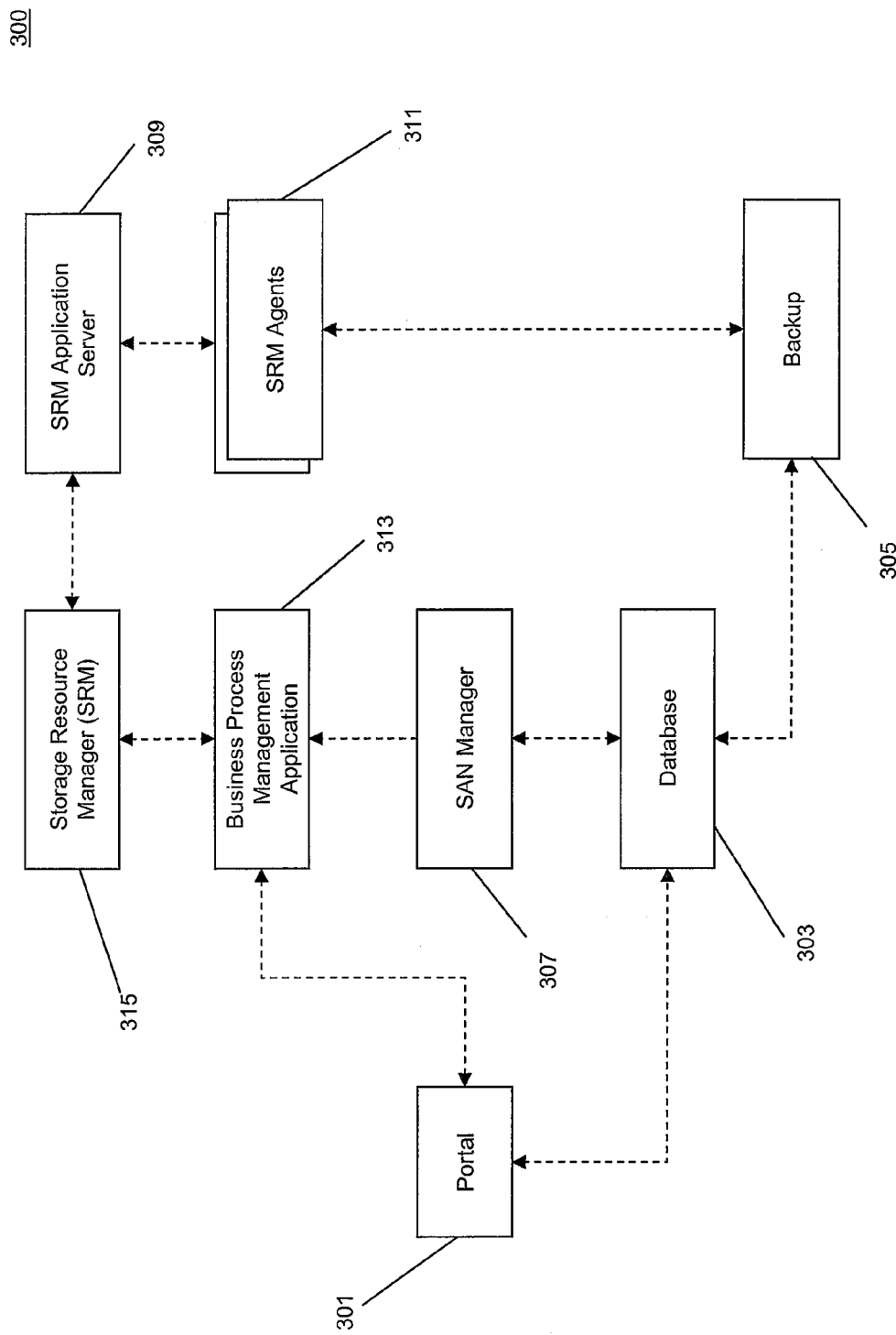
FIG. 3 illustrates an example of a component diagram for Active to Efficient storage management maturity levels, according to various embodiments of the invention.

FIG. 3 illustrates a component diagrams 300, which details an example of some of the components for an Active (level 1) to Efficient (level 2) storage management infrastructure. In some embodiments, the infrastructure illustrated in FIG. 3 and/or other infrastructure may be utilized in conjunction with the systems and processes described herein (e.g., process 100). FIG. 3 illustrates a portal 301 (e.g. Computer Associates™ (CA) Portal) that communicates with a database 303 (e.g., a Microsoft™ MS-SQL database). In some embodiments, database 303 may provide web-based access to storage management and high level storage management reporting using web services technology such as, for example CA iTechnology™ to deliver on-demand access directly to each of: one or more backup servers 305 (e.g., CA ARCserve Backup servers), storage area network managers 307 (e.g., CA SAN Managers), and storage resource management application servers 309 (e.g., CA Storage Resource Manager Application servers). This architecture additionally enables an organization to access many of the storage devices directly from a browser. Portal 301 (e.g., CA Portal) provides access to the reports generated by a storage management application (e.g., CA Storage Resource Manager) supported by the storage resource management server(s) 309. As used herein iTechnology refers to a web services-based technology that provides an XML/SOAP-based request-response architecture to enable management of storage instruments by collecting and monitoring data and invoking command and control devices. Other services exposed as Web services include discovery, asynchronous event collection and propagation.

Backup servers 305 and their associated backup applications (e.g., CA ARCserve Backup) provide the local and remote backup and recovery operations of Windows™, Unix, and NetWare systems. Additional options for SAN, Library, specific client backup enhancements such as Open File Agents and specific Application Agents such as the Microsoft™ SQL server or Oracle™ agents may be required subject to the needs of the server being protected. The backup servers 305 use database 303 to store backup/recovery job information, user, and tape media information, or other information.

SAN manager 307 provides a business-centric SAN management solution that simplifies the monitoring and management of complex networked storage resources. It combines configuration and business-centric management with advanced discovery, visualization, real-time health monitoring and centralized management. For example, SAN manager 307 helps ensure the optimum health and availability of a complex SAN environment. A SAN manager object repository (e.g., CA SAN Manager Object Repository) is stored in database 303 (e.g., MS-SQL Database). Alerts from each of the applications such as the backup application and the storage management application the SAN manager server 307.

The storage resource management application server 309 and its associated storage management application provides centralized management of storage resources for the distributed computing environment. The application server 309 provides the ability to analyze, manages, report on, schedules and automates networked storage resources across distributed environments. It offers comprehensive support for leading applications, databases, devices and systems to enable complete end-to-end resource management.

The example of an Active to Effective storage management infrastructure illustrated in FIG. 3 may also include one or more storage resource manager agents 311 (e.g., CA SRM Agent) that integrate with the backup servers 305 and or file systems for collecting and sending information to storage resource manager application server 309 in order to create the backup/recovery reports and storage utilization reports. The example may also includes an SRM manager application 315 (e.g., CA SRM Manager).

The example of an Active to Effective storage management infrastructure illustrated in FIG. 3 may also include a business process management application 313 (e.g., CleverPath™ Aion® BPM) which provides the business process management, rules management and business activity monitoring. It incorporates technologies such as workflow, portal, business intelligence and predictive analysis, providing the ability to effectively monitor, manage and optimize business processes and their performance. In addition, it enables the business domain experts to define and maintain business terms and business rules in an easy-to-use, web-based user interface presented through the portal 301.

Database 303 (e.g., Microsoft SQL Server) is the database that is used by SAN manager 307, portal 301 and backup server 305 to store the, storage asset, reporting and backup/recovery job information.

Figure 4:
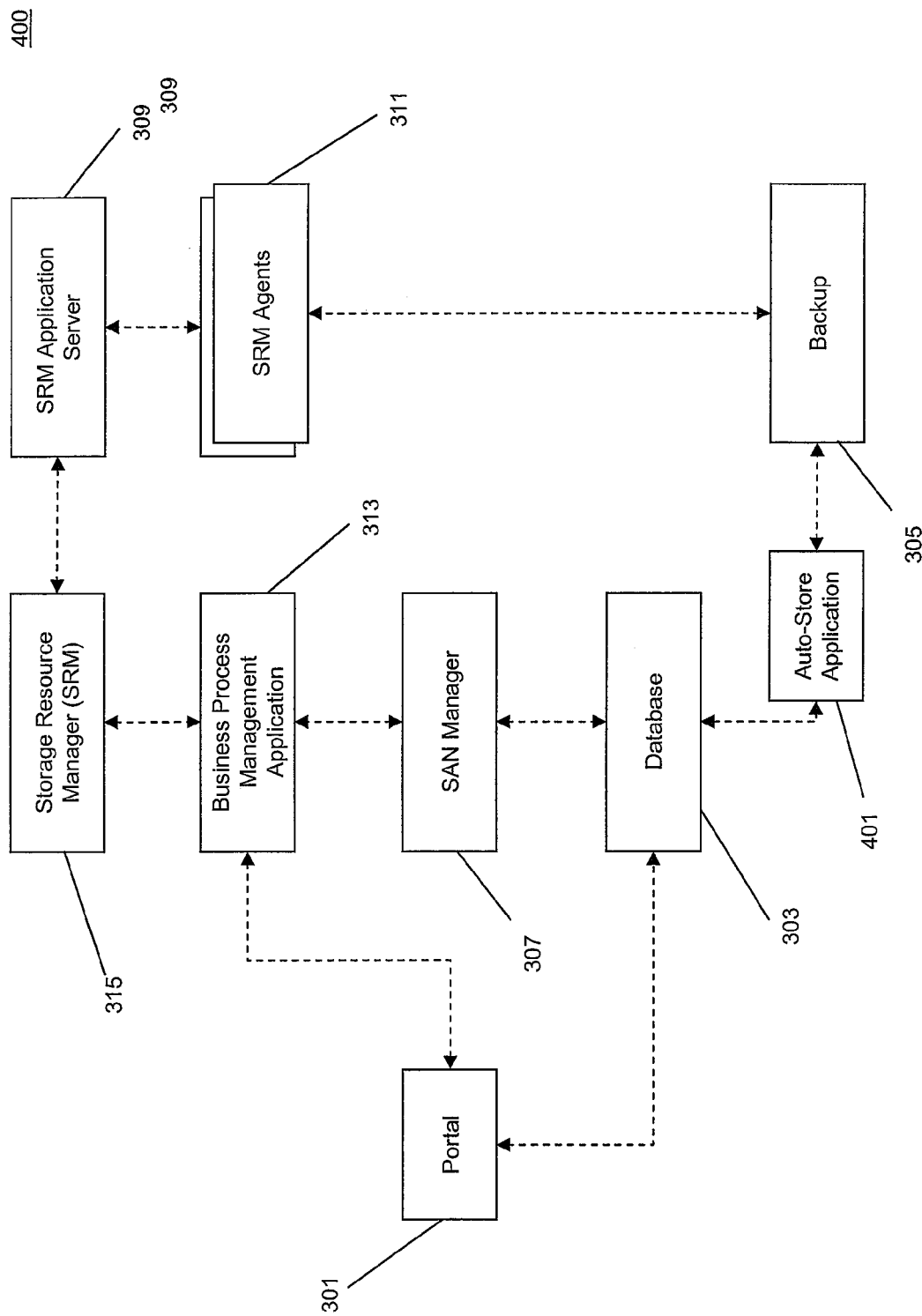
FIG. 4 illustrates an example of a component diagram for Efficient to Responsive storage management maturity levels, according to various embodiments of the invention.

FIG. 4 illustrates a component diagram 400 that details an example of some of the components for an Efficient (level 2) to Responsive (level 3) storage management infrastructure. In addition to some or all of the elements discussed above regarding FIG. 3, components of diagram 400 may also include an auto-store application 401 (e.g., CA Arkivio Auto-Stor) that automates implementation of tiered-storage architecture. Auto-store application 401 enables organization and classification of data and storage resources based on how important the assets are to the company. It automates data migration and placement to under-utilized capacity or from one tier of storage to another without disrupting end user or application access to their data. Auto-store application 401 is integrated with the backup server 305 and associated applications in order to protect the tiered-storage architecture based on the defined service levels for each storage tier.

Figure 5:
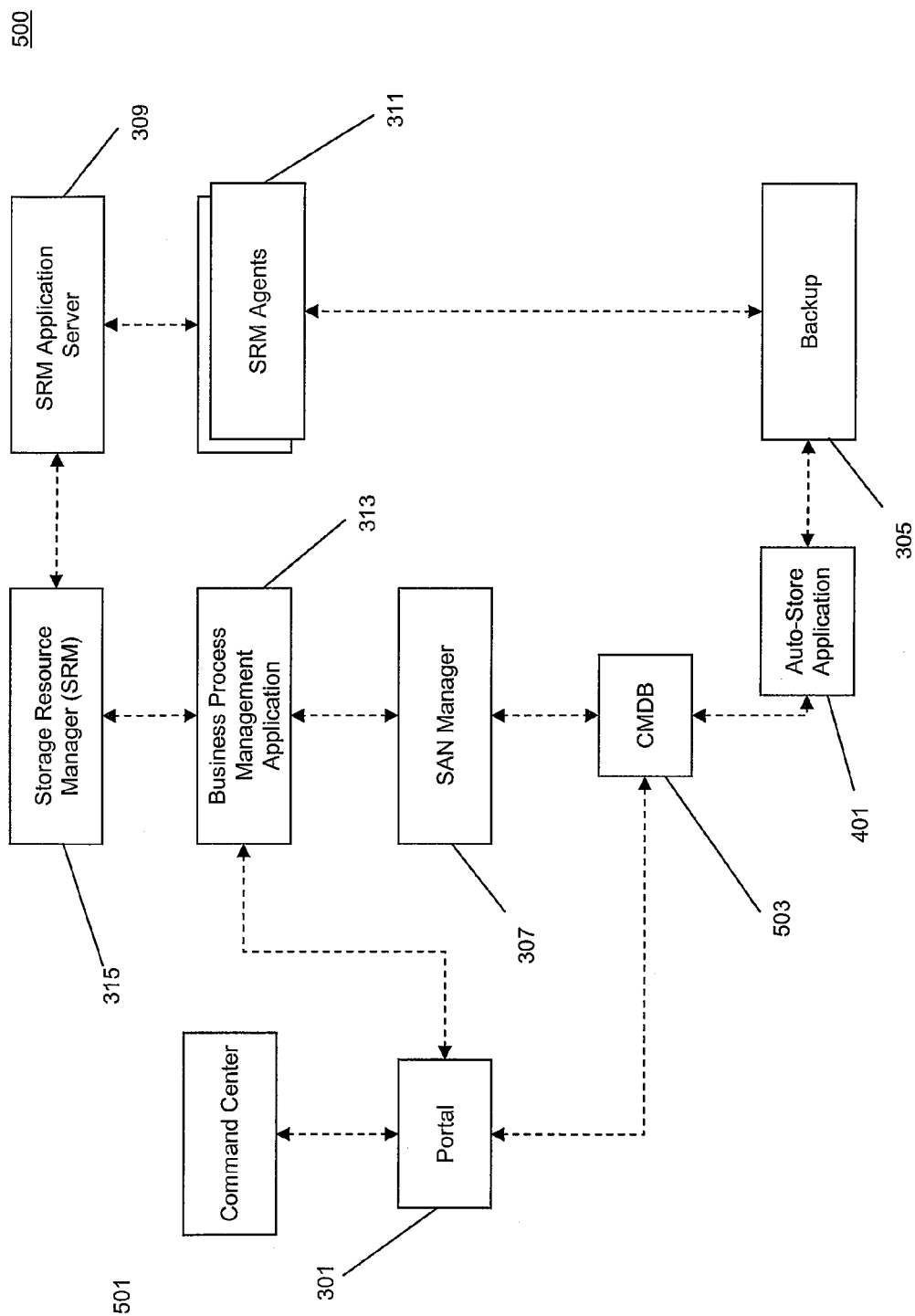
FIG. 5 illustrates an example of a component diagram for Responsive to Business-Driven storage management maturity levels, according to various embodiments of the invention.
Figures 1, 6A:
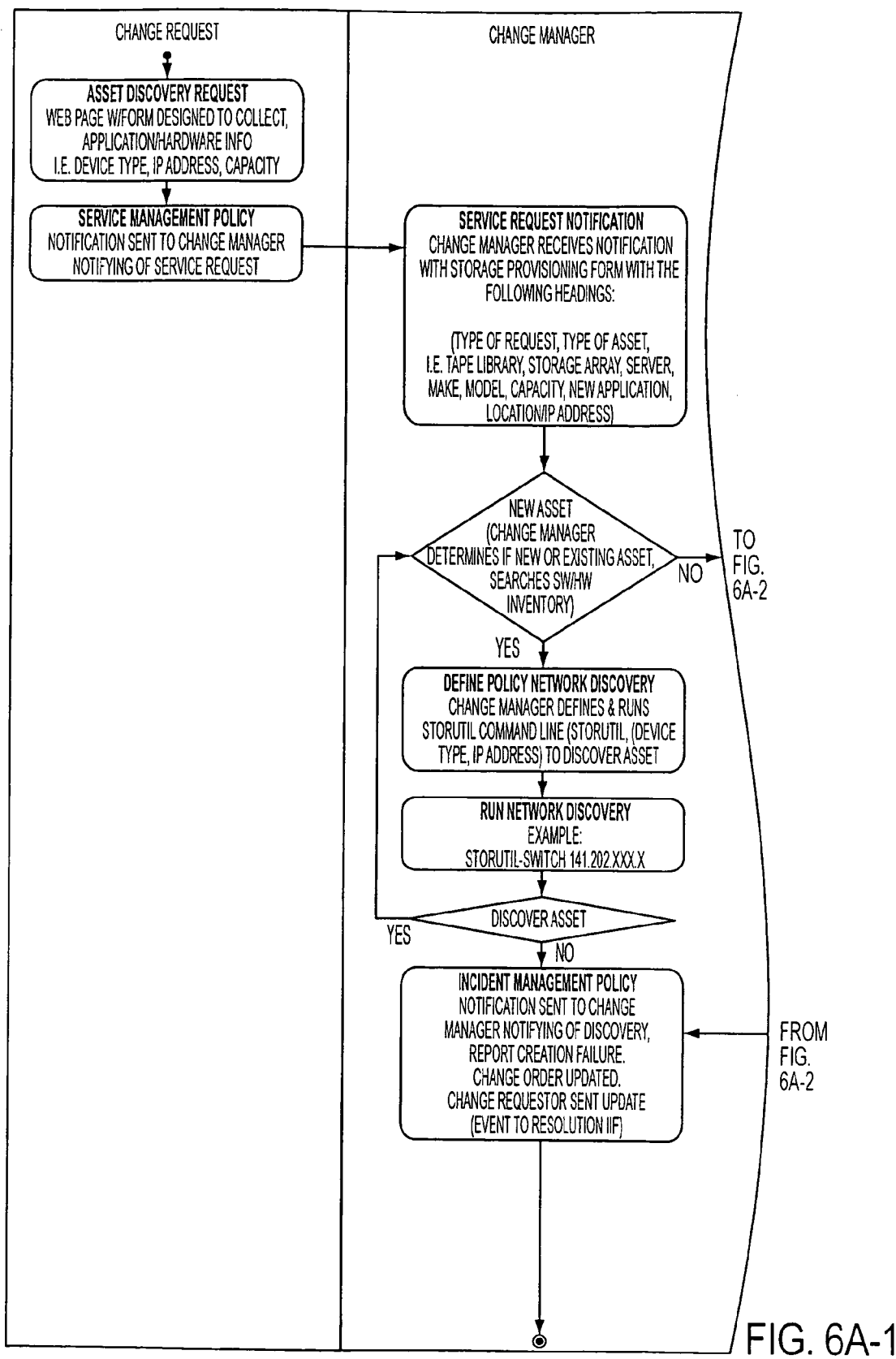
Figures 2, 6A:
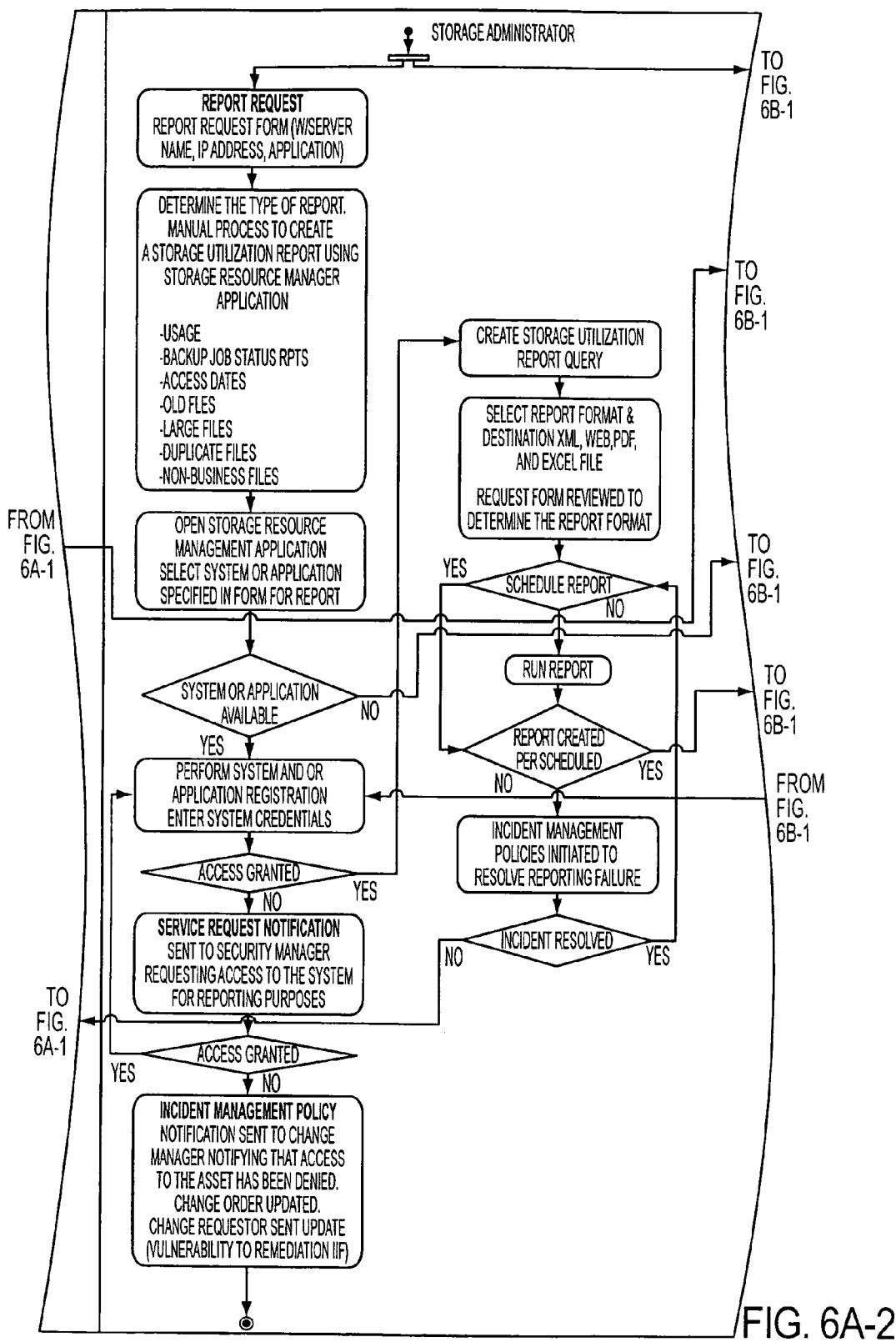
Figures 1, 6B:
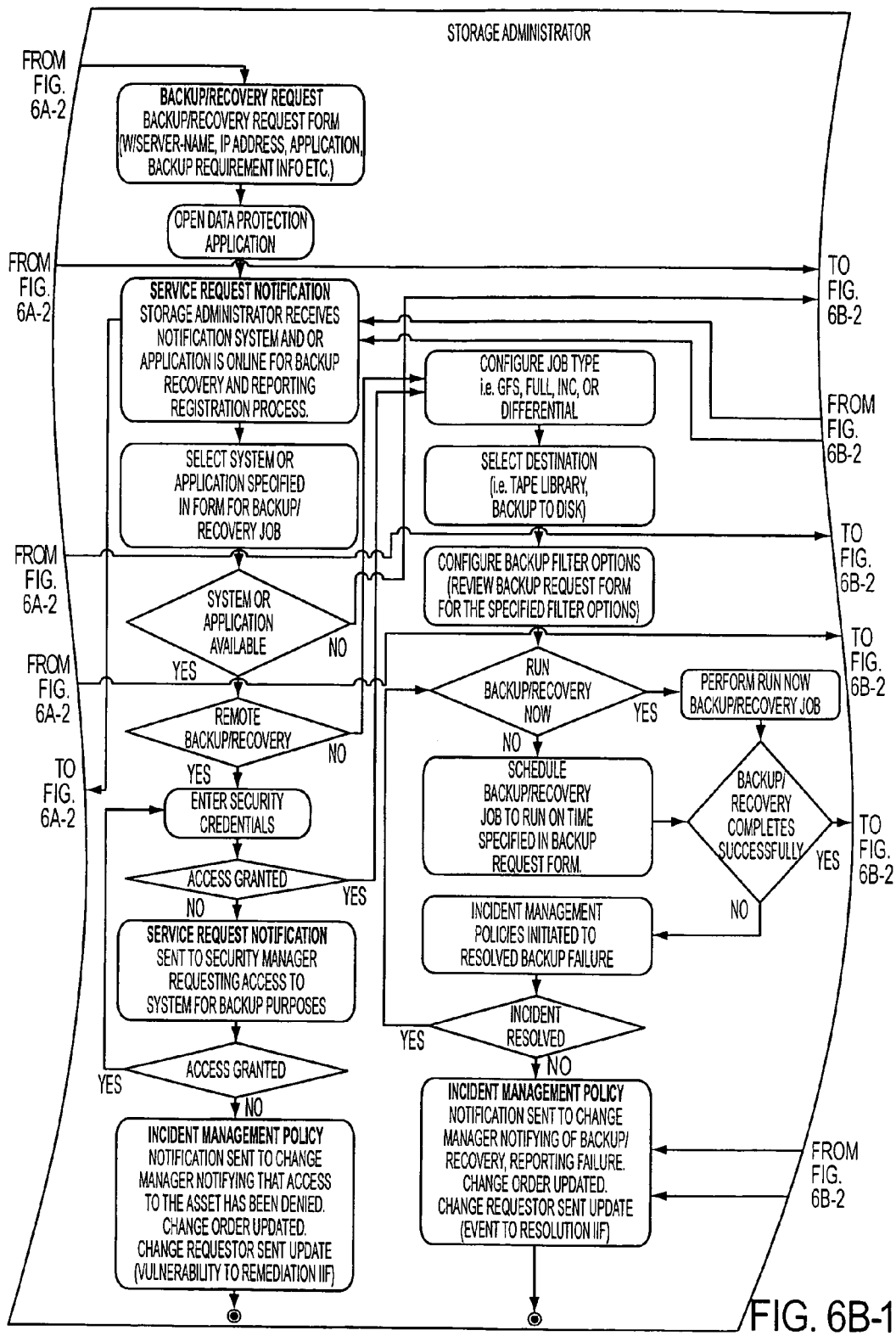
Figures 2, 6B:
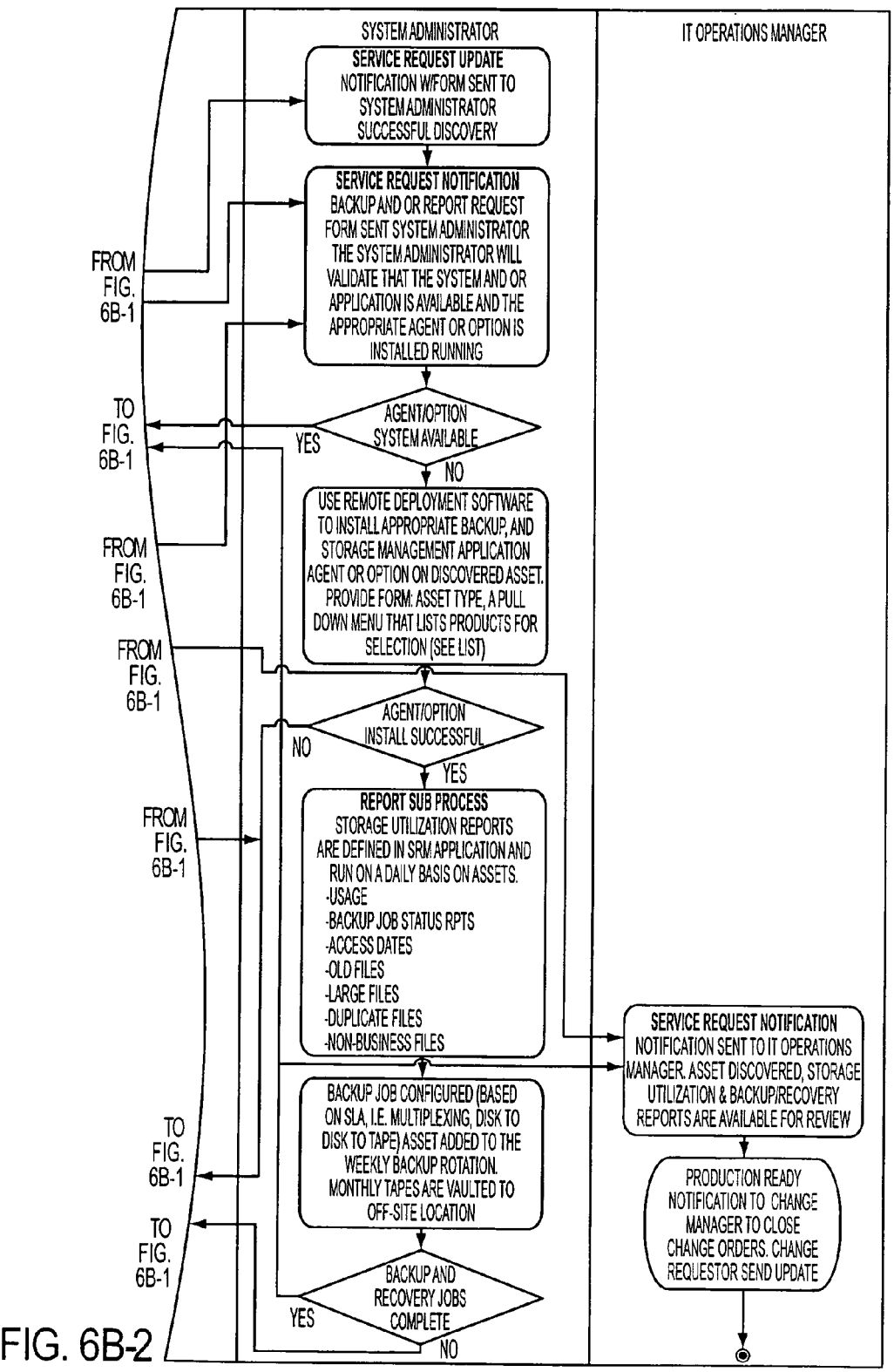
Figures 1, 7A:
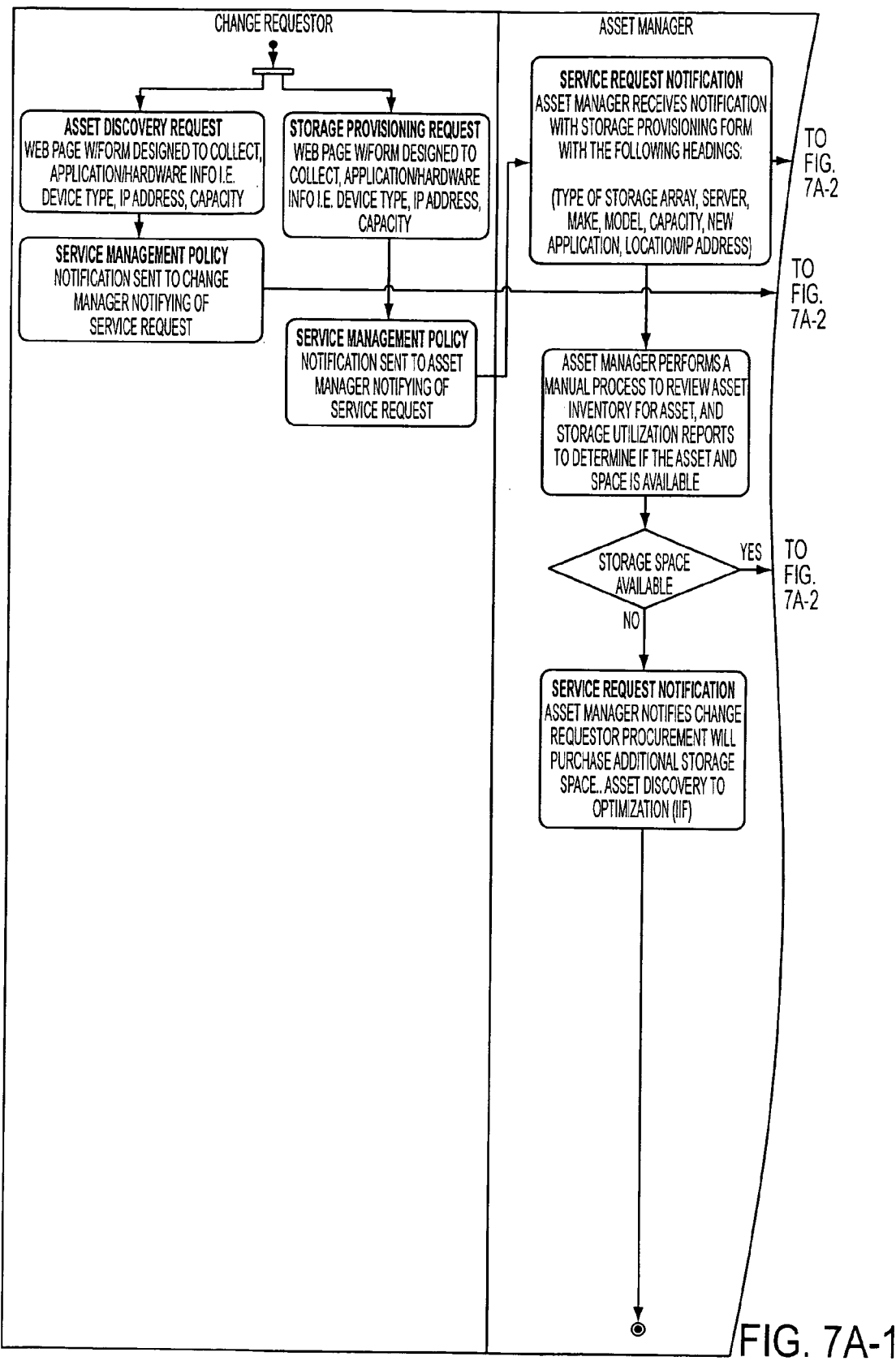
Figures 2, 7A:
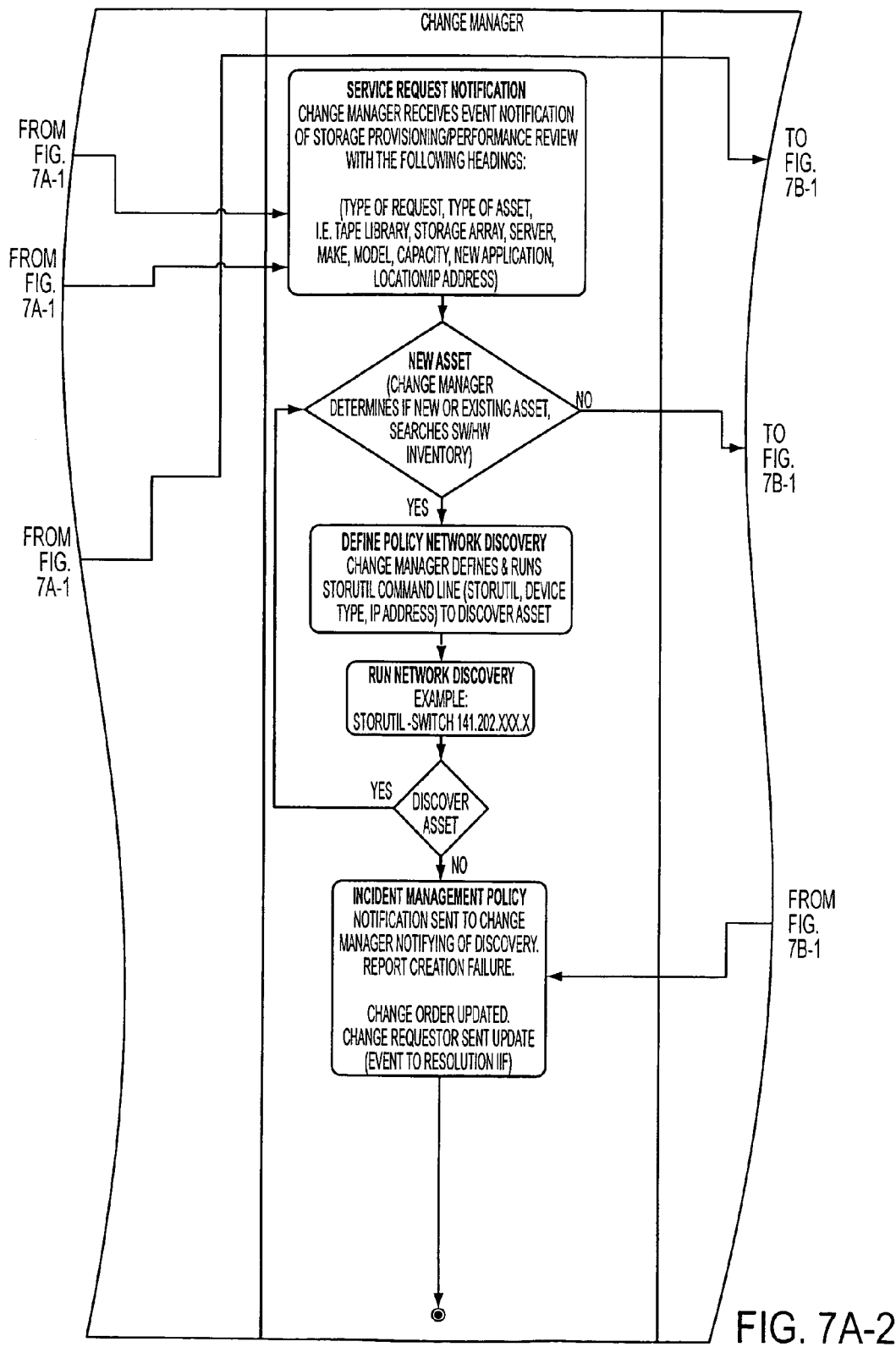
Figures 1, 7B:
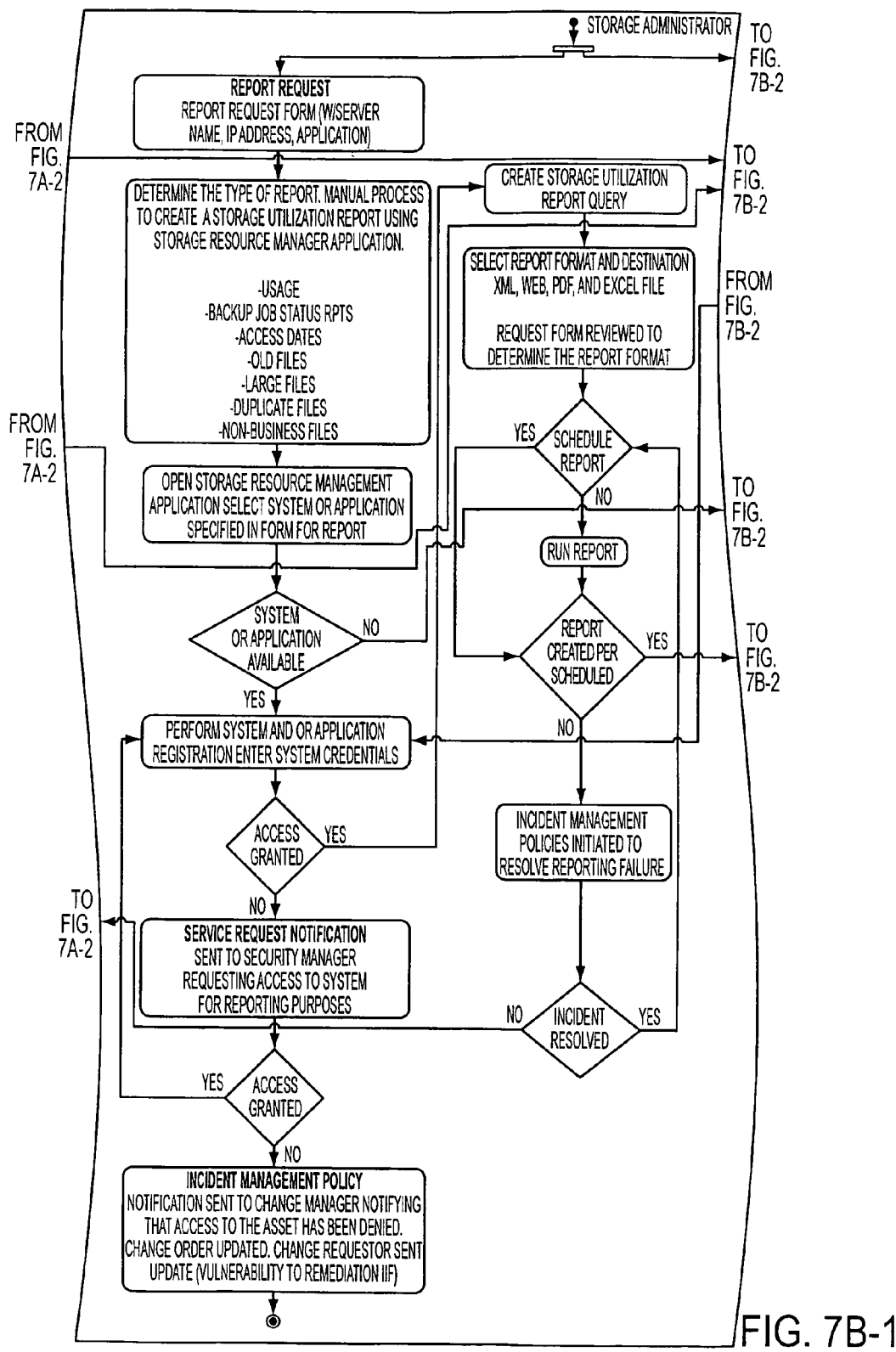
Figures 2, 7B:
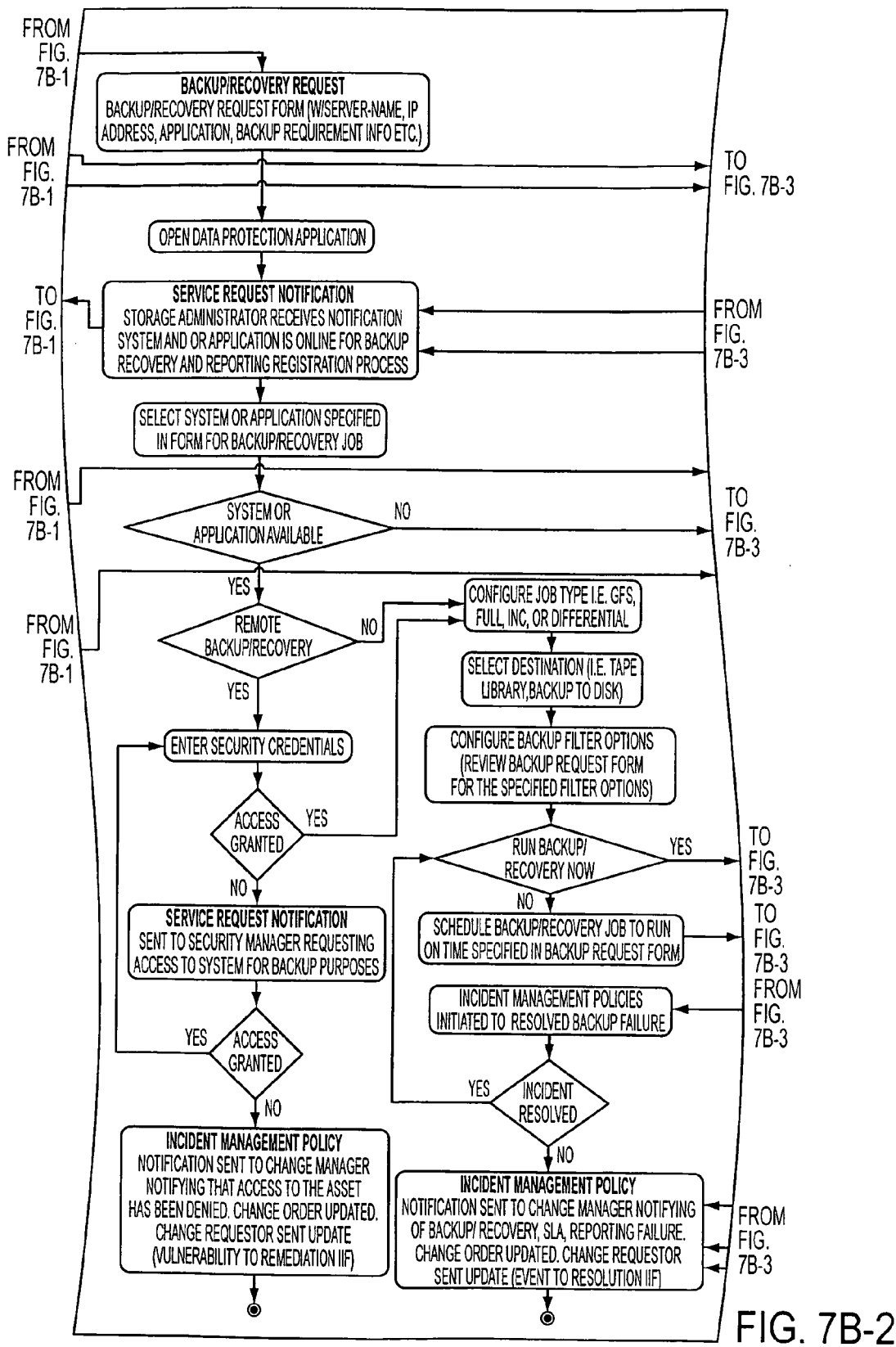
Figures 3, 7B:
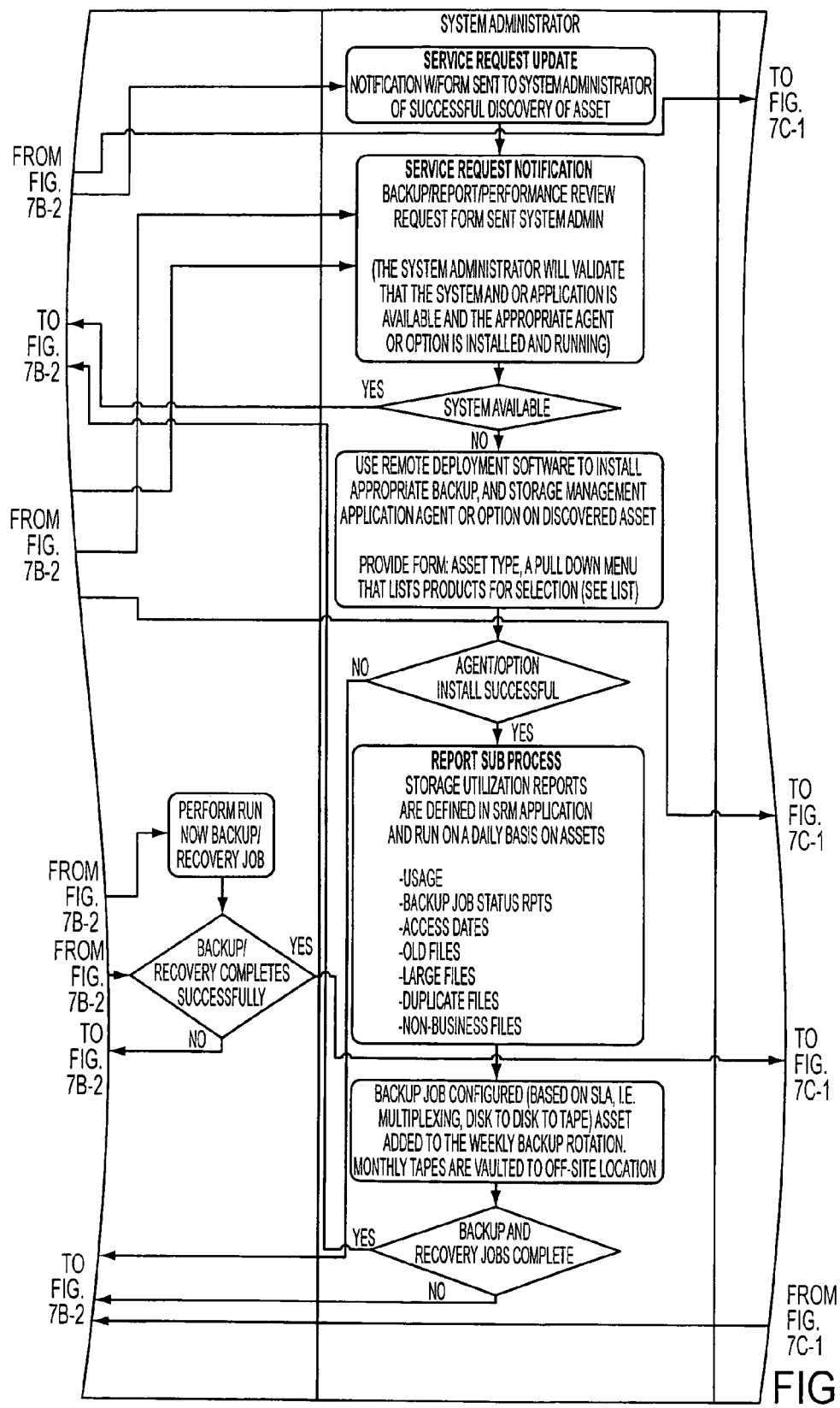
Figures 2, 7C:
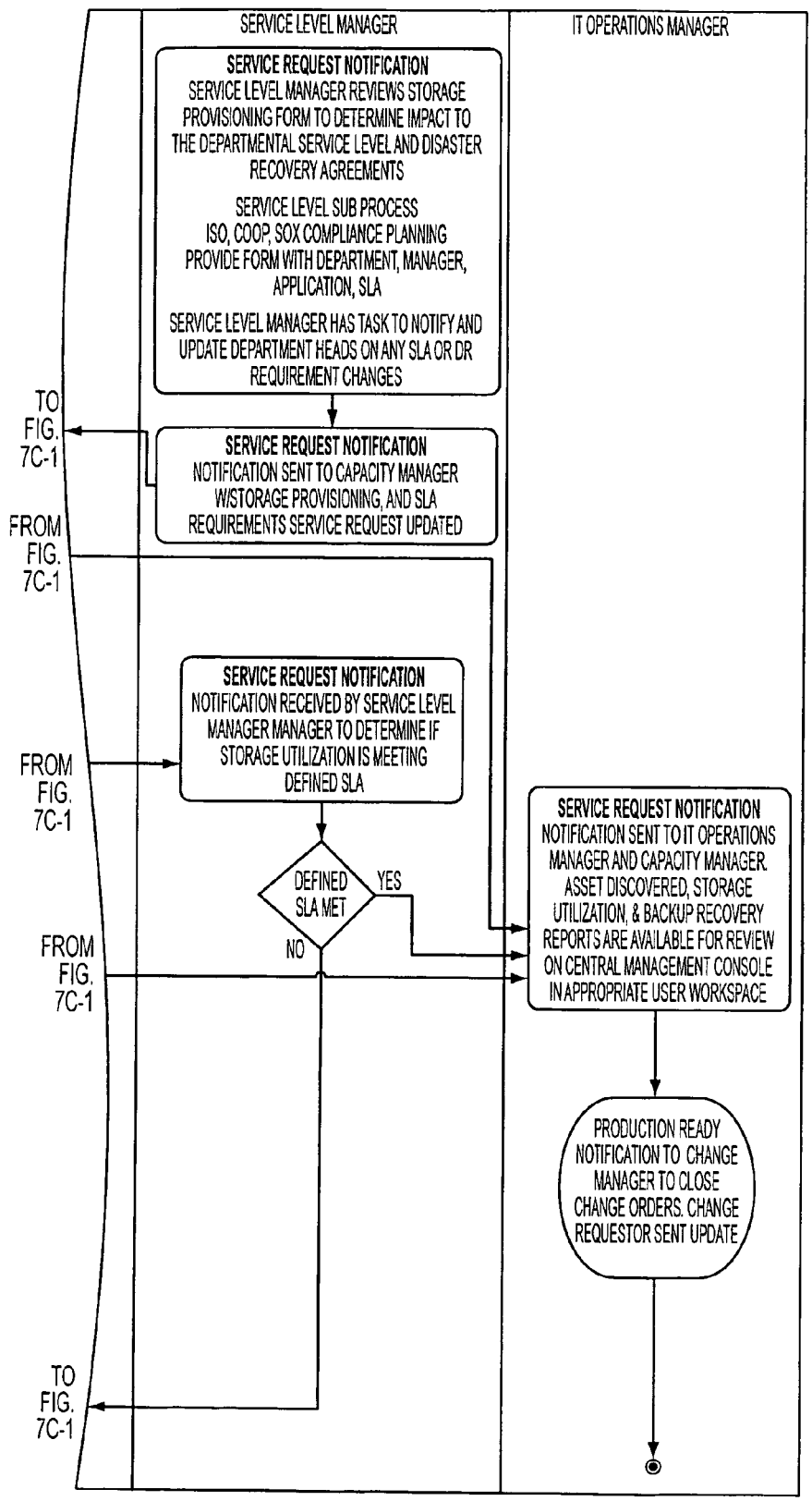
Figures 1, 8A:
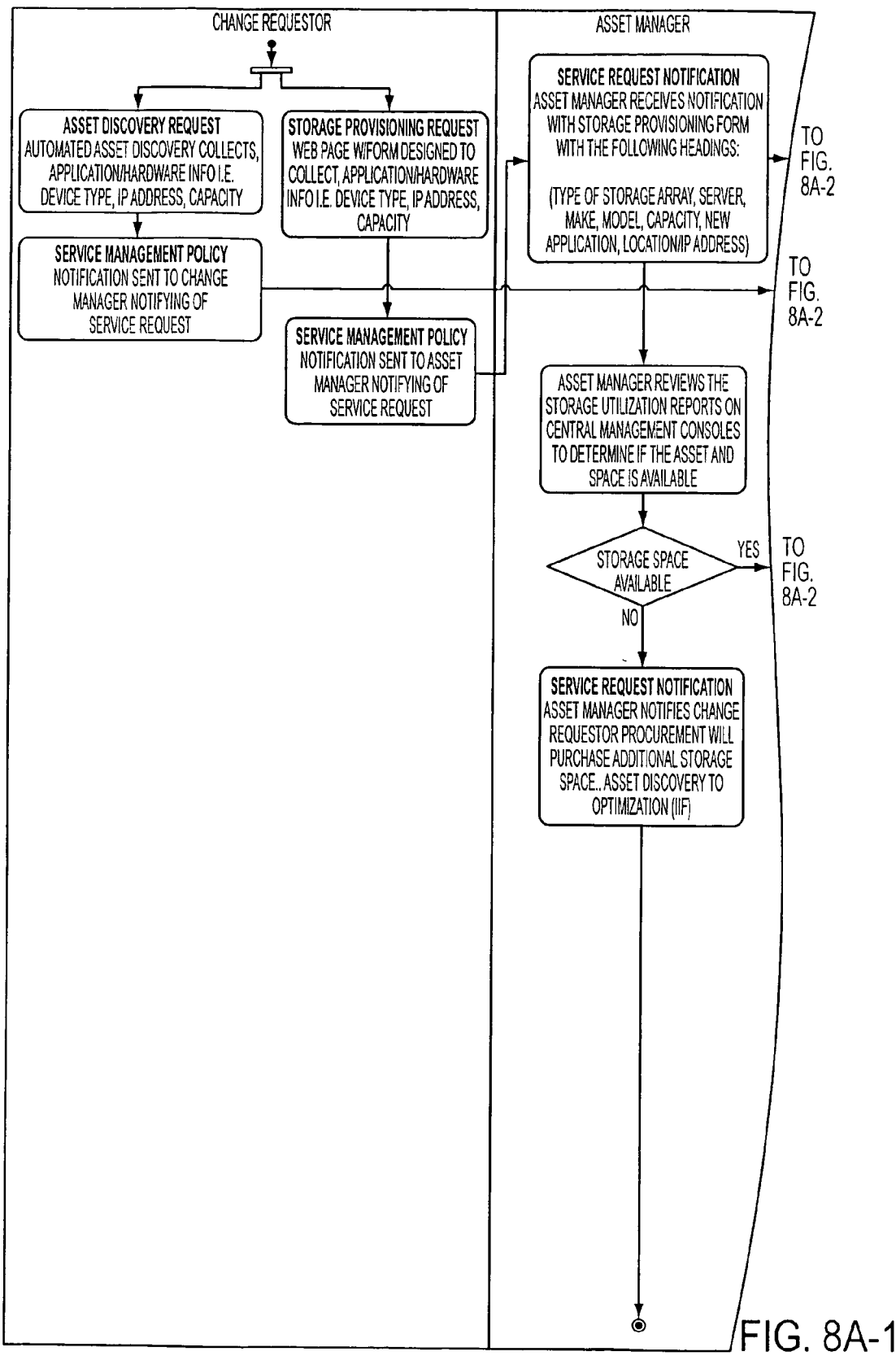
Figures 2, 8A:
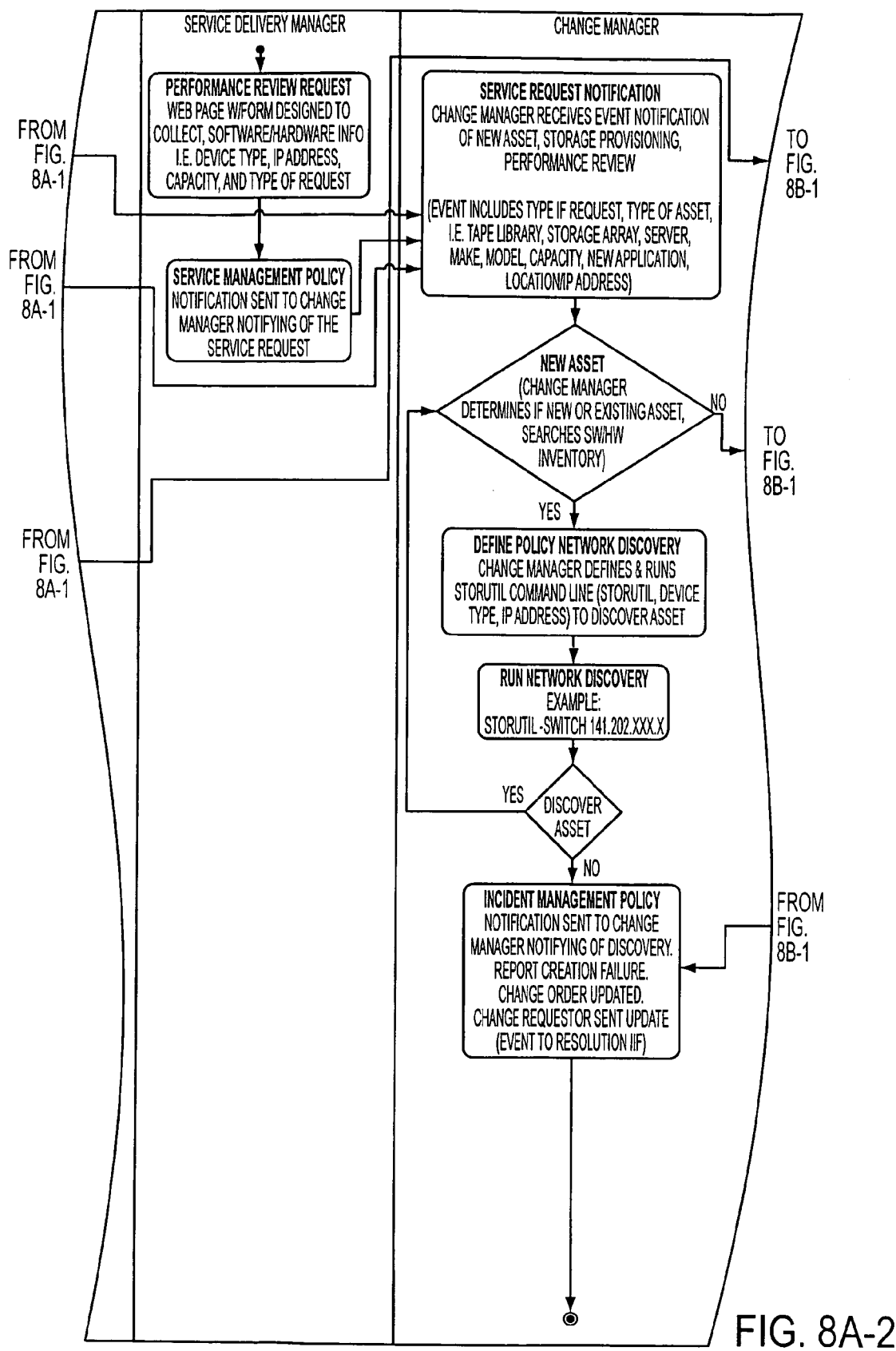
Figures 1, 8B:
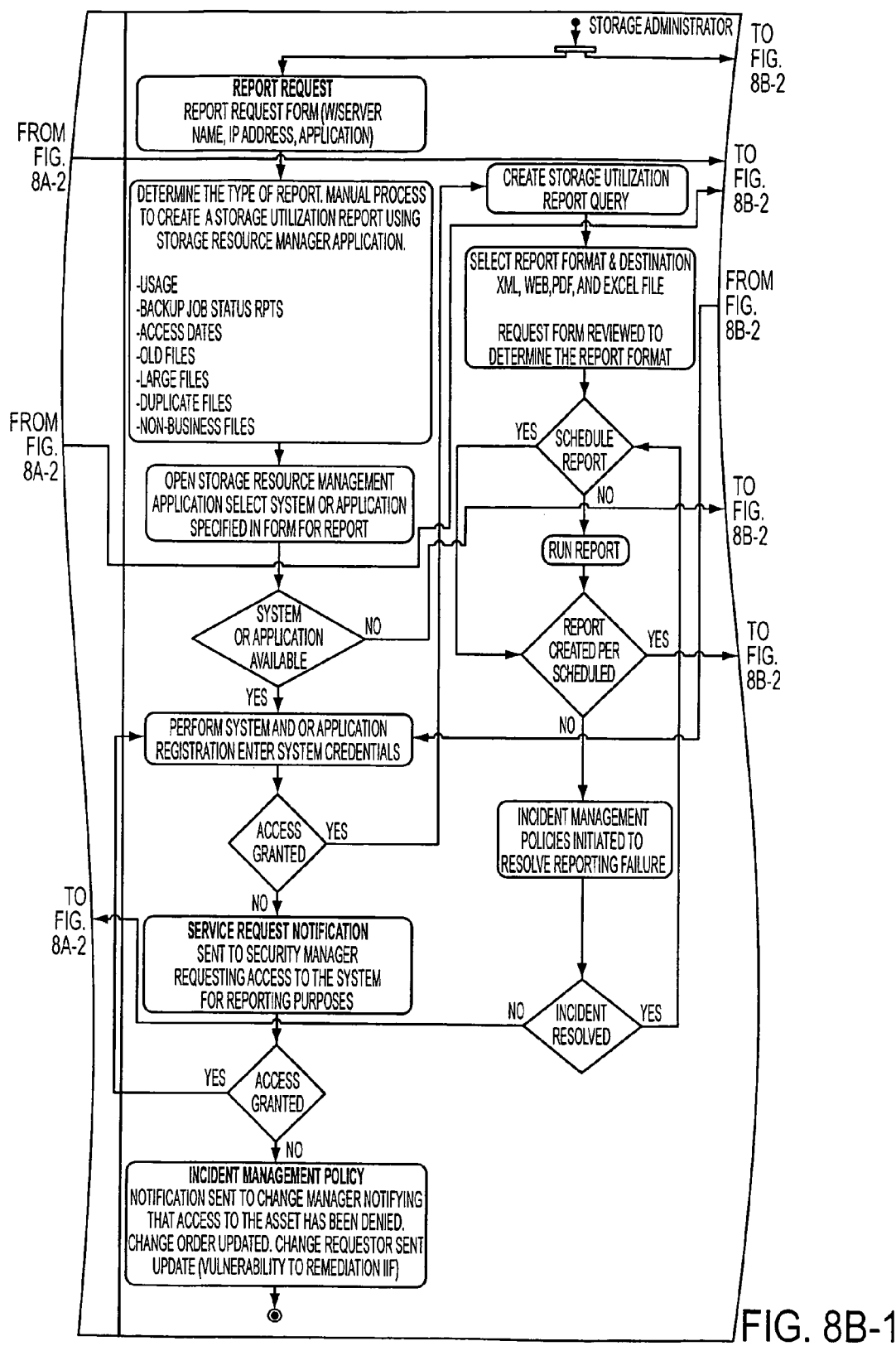
Figures 2, 8B:
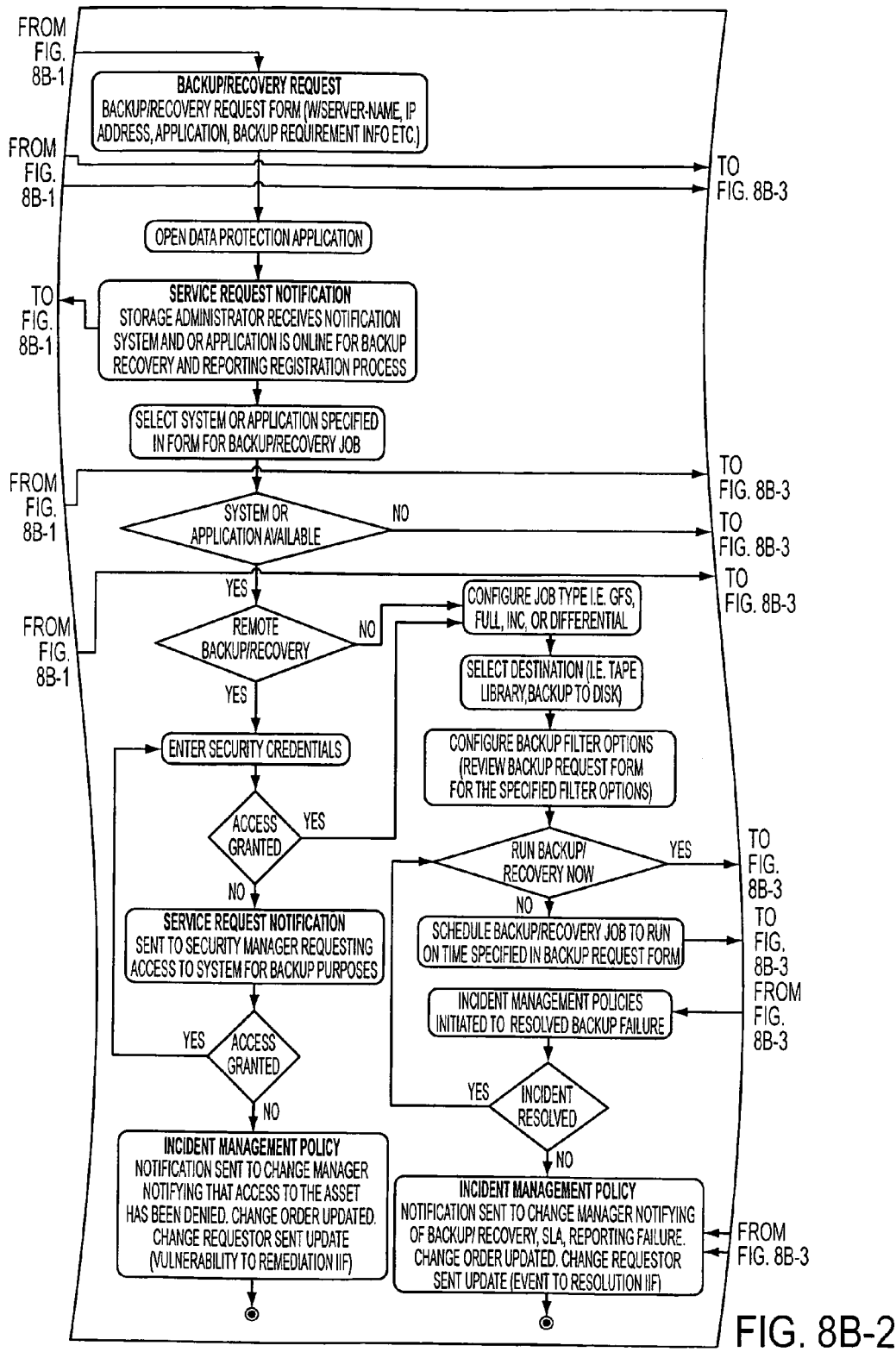
Figures 3, 8B:
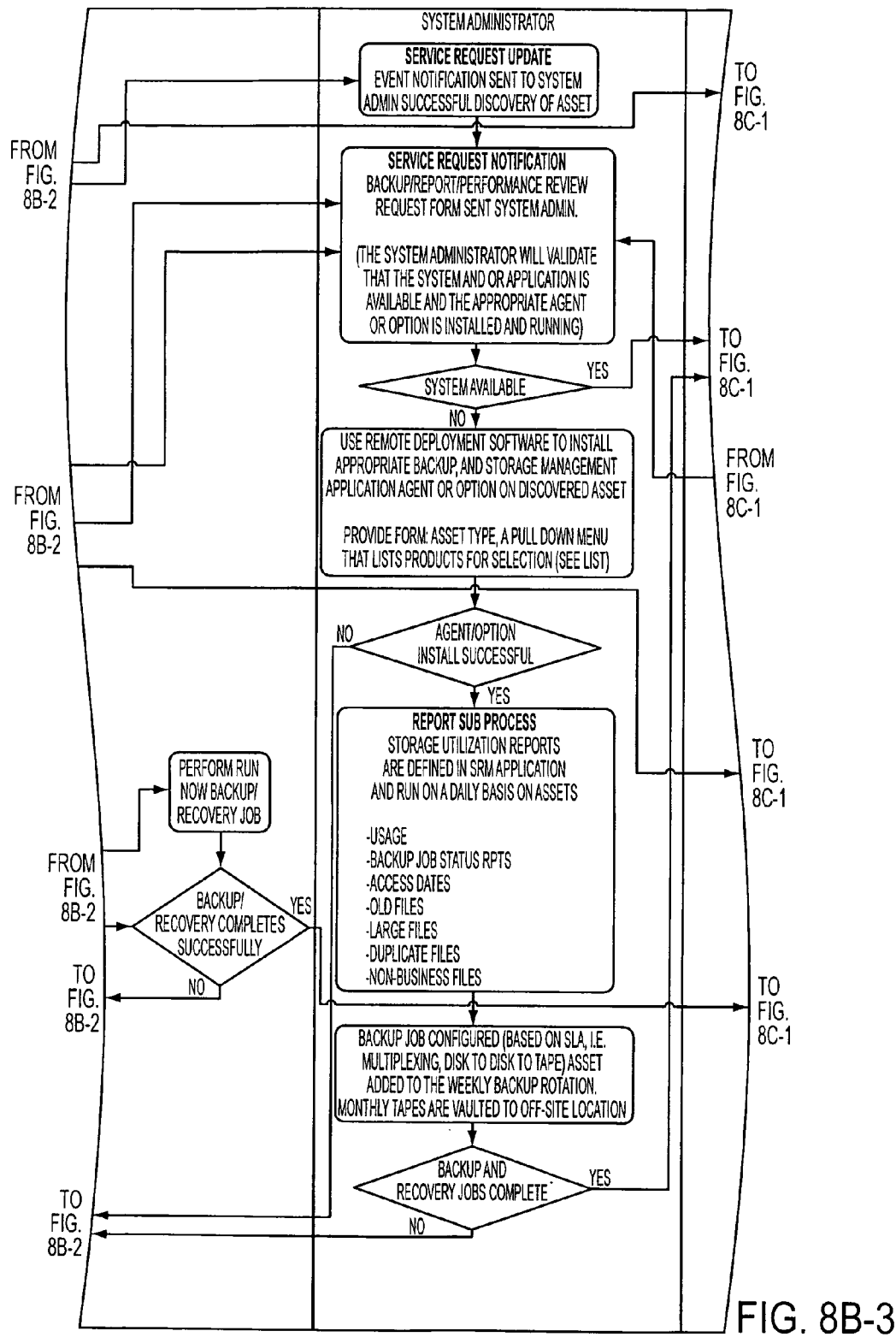
Figures 1, 8C:
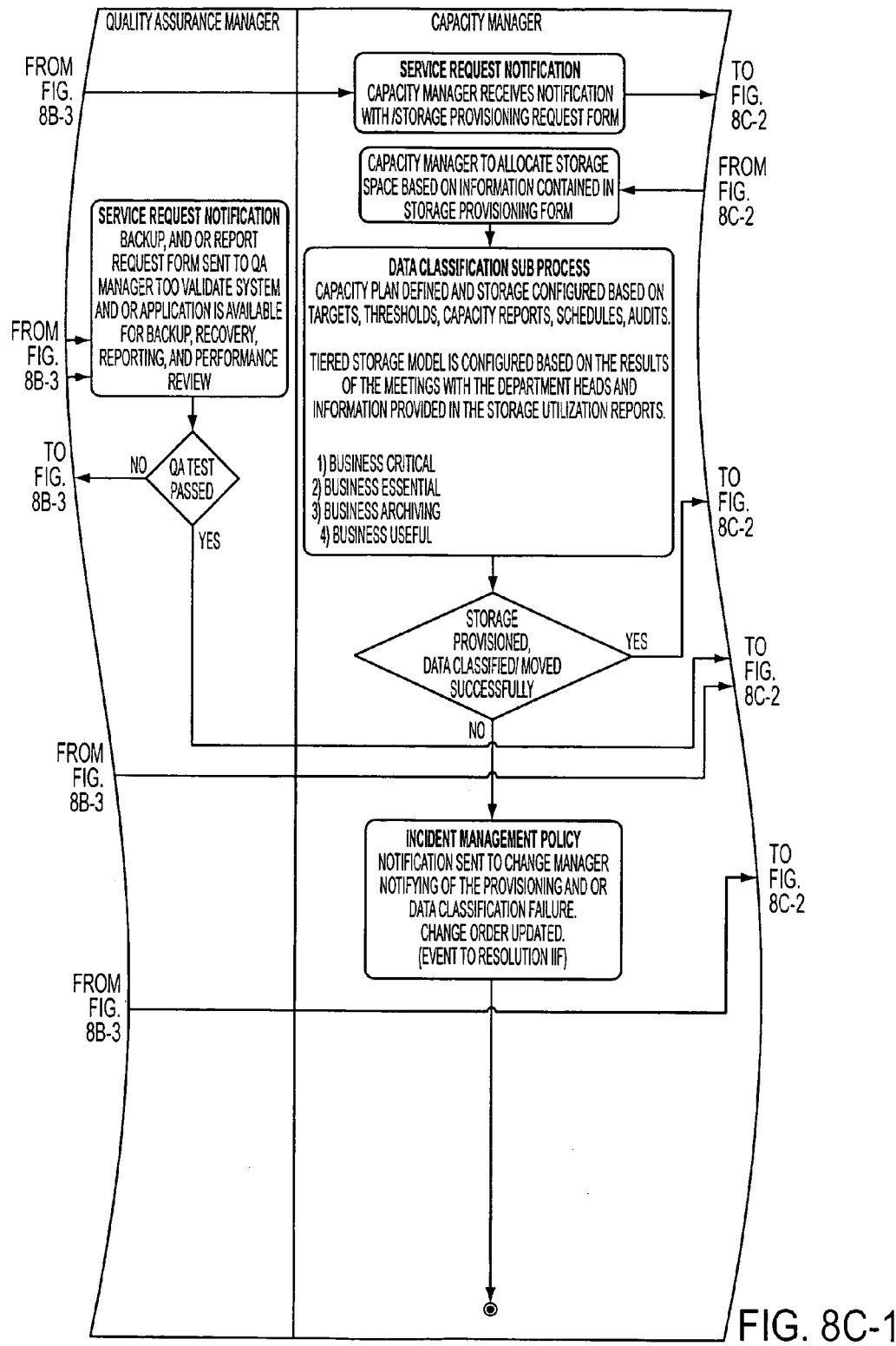
Figures 2, 8C:
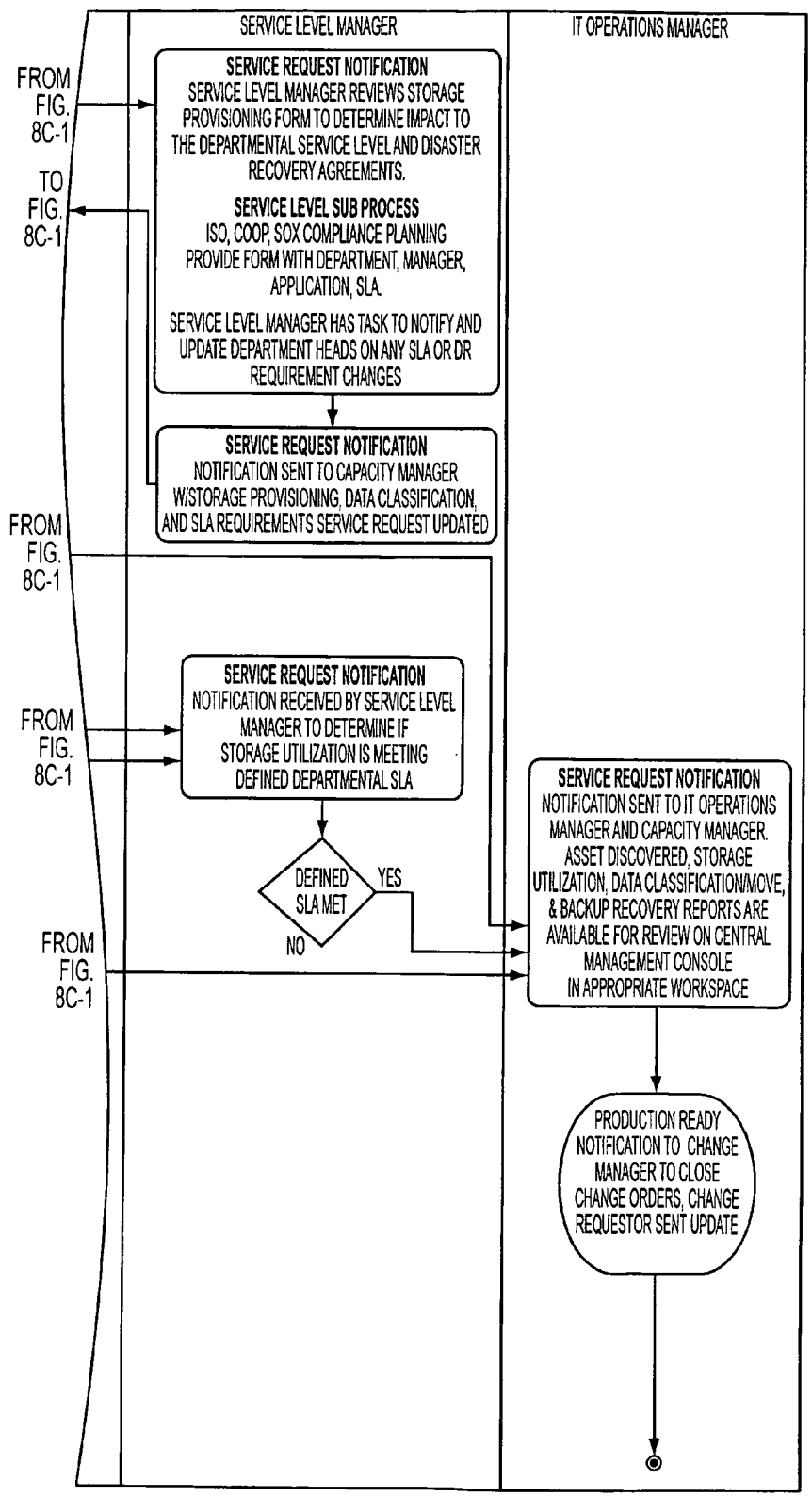
Figures 1, 9A:
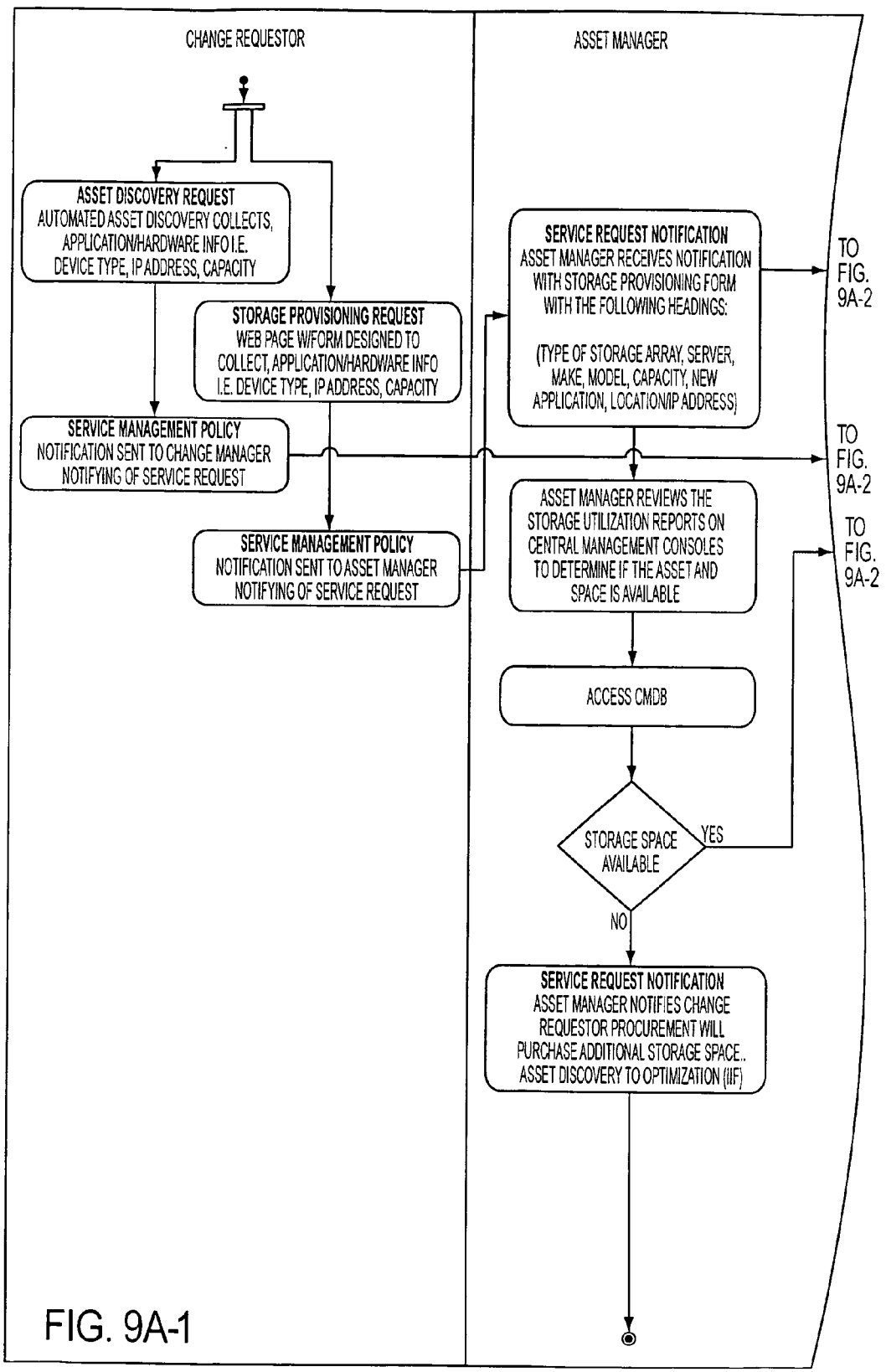
Figures 2, 9A:
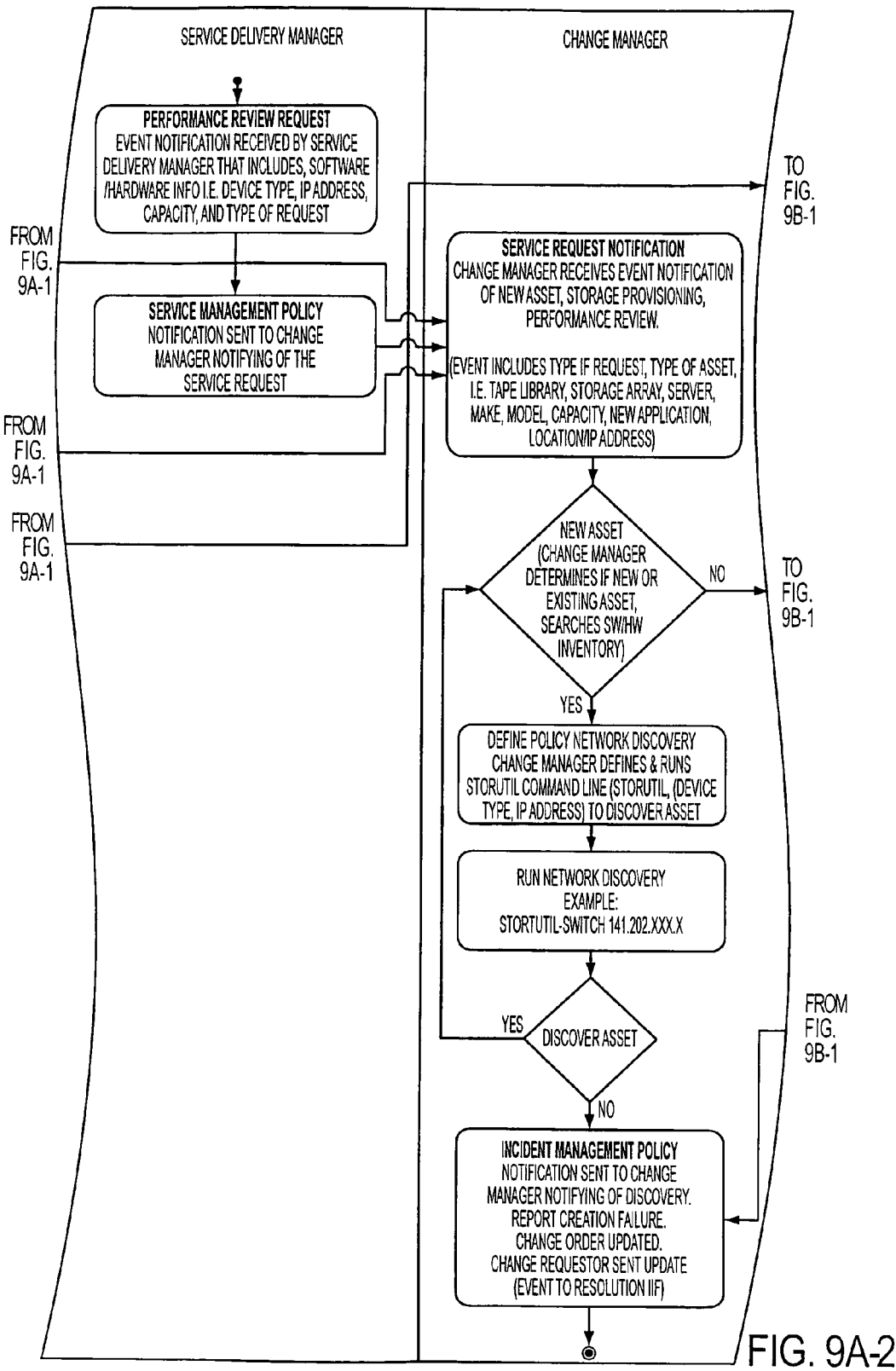
Figures 1, 9B:
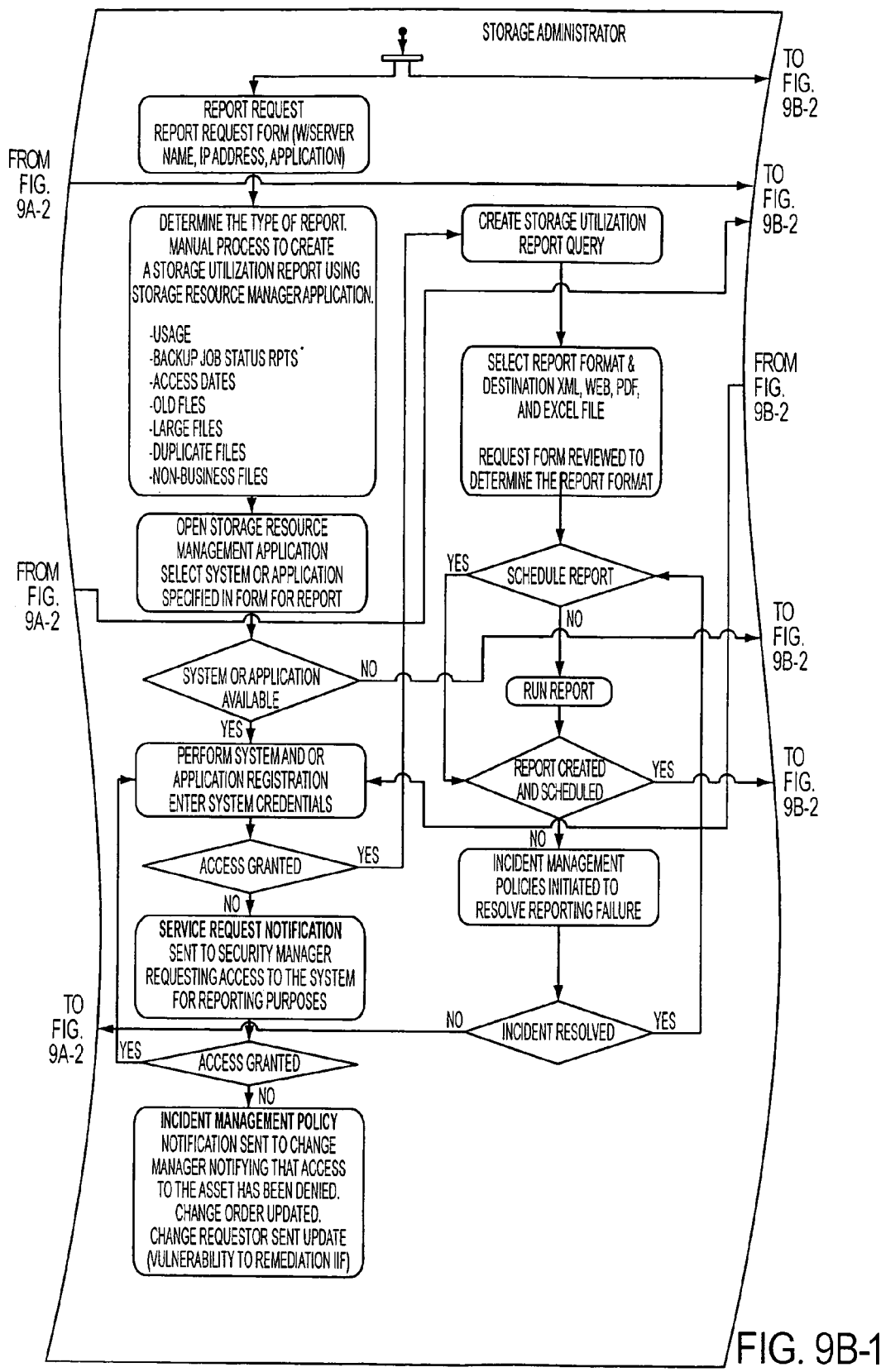
Figures 2, 9B:
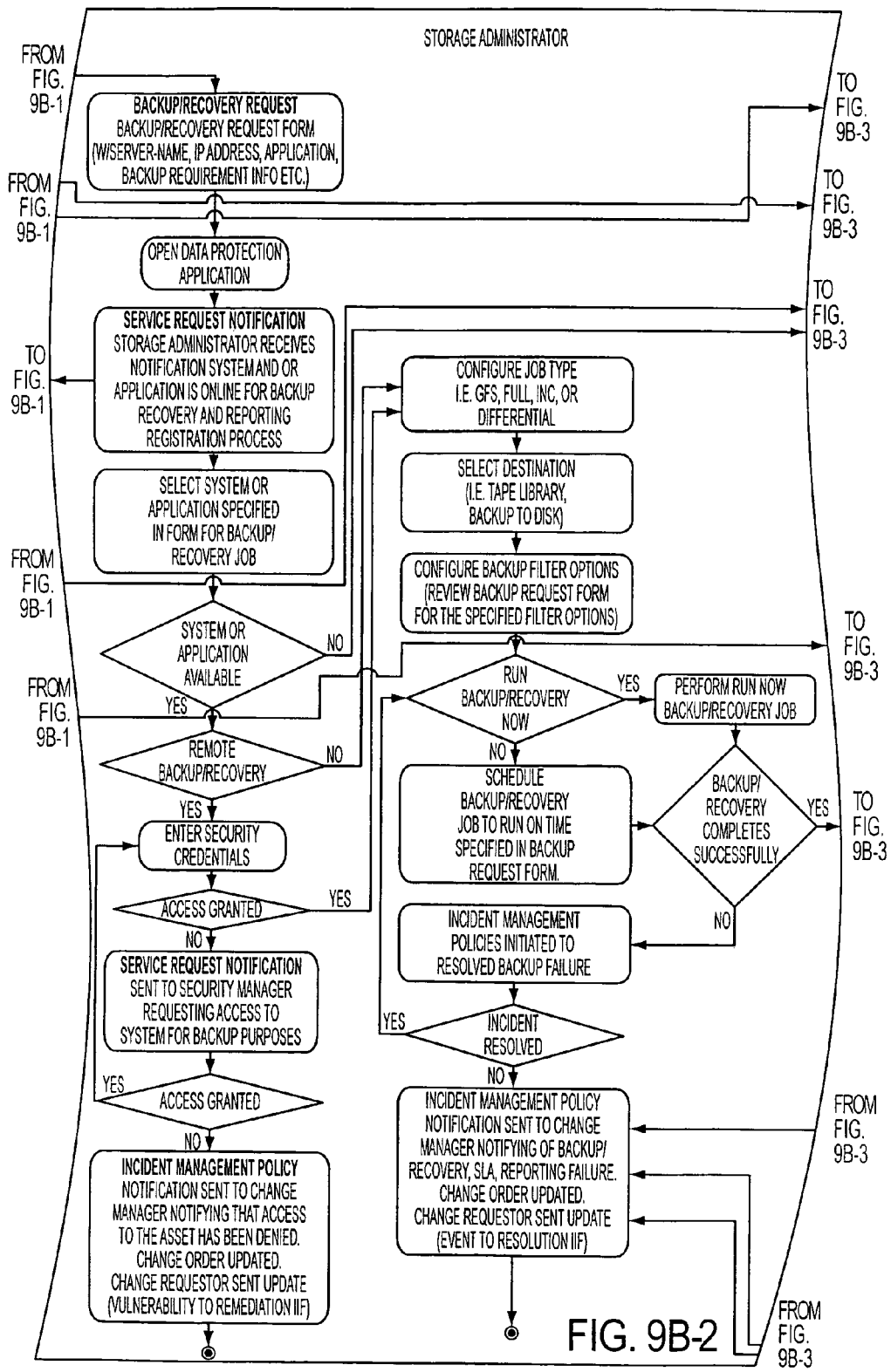
Figures 3, 9B:
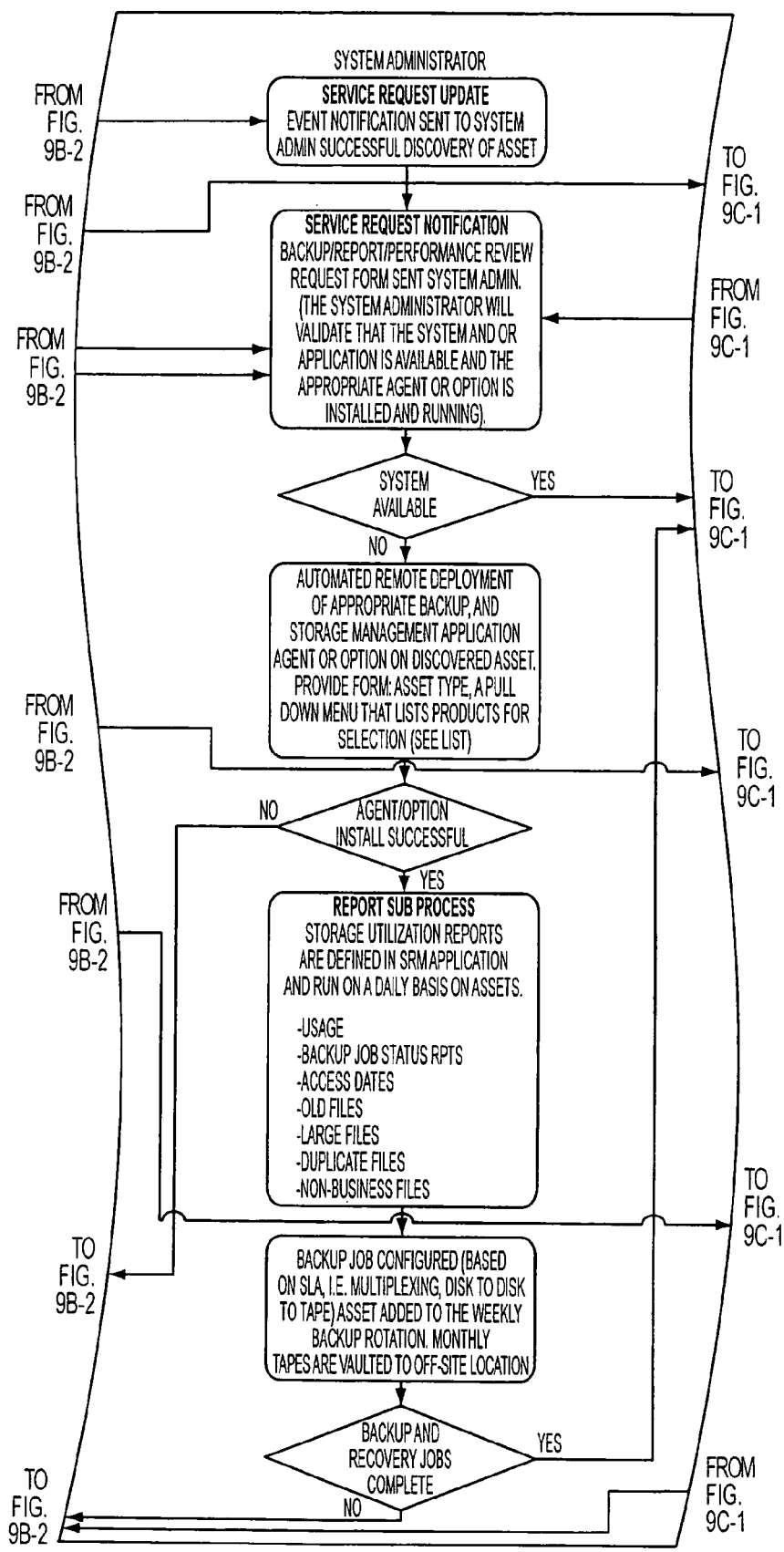
Figures 1, 9C:
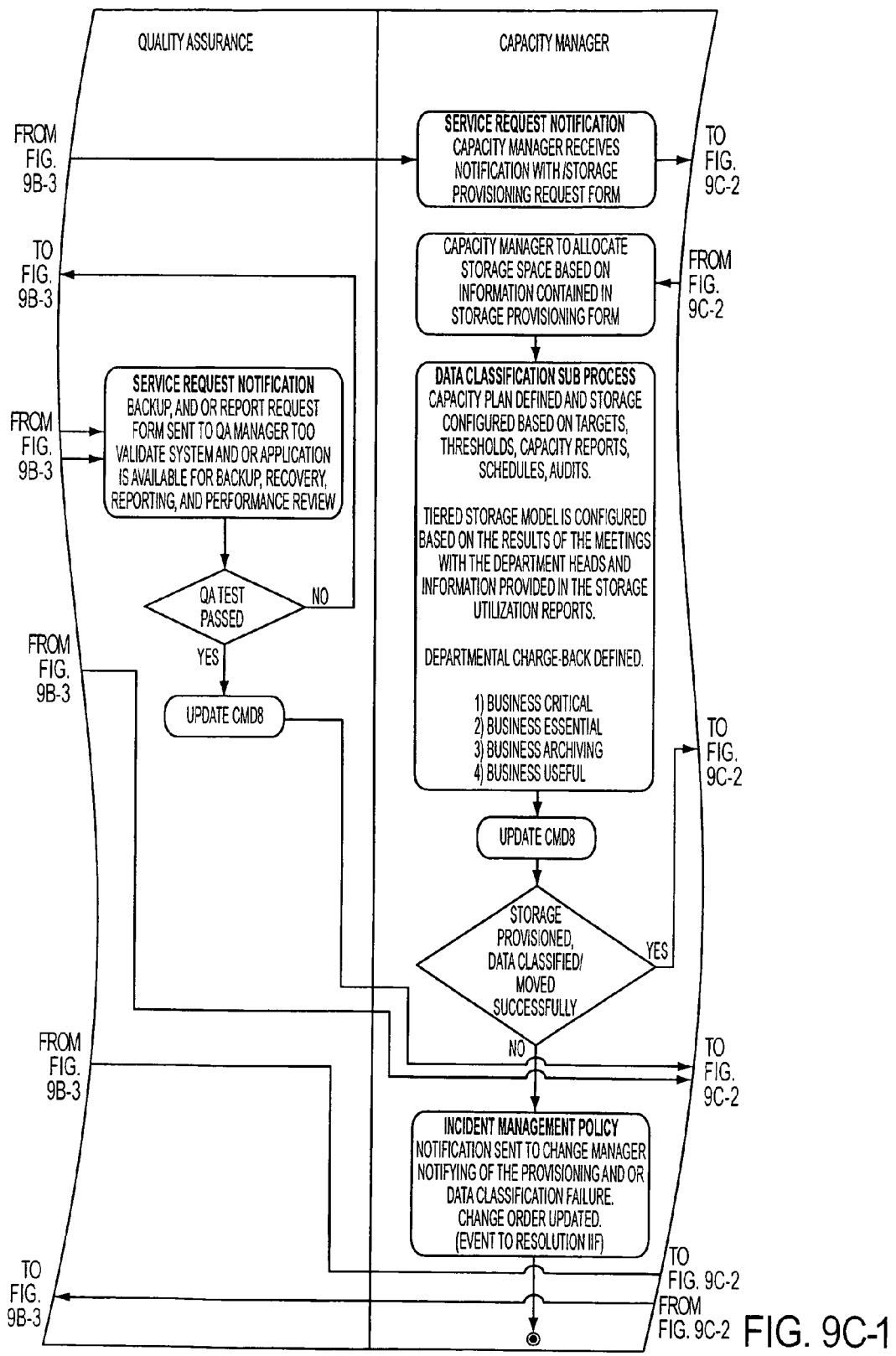
Figures 2, 9C:
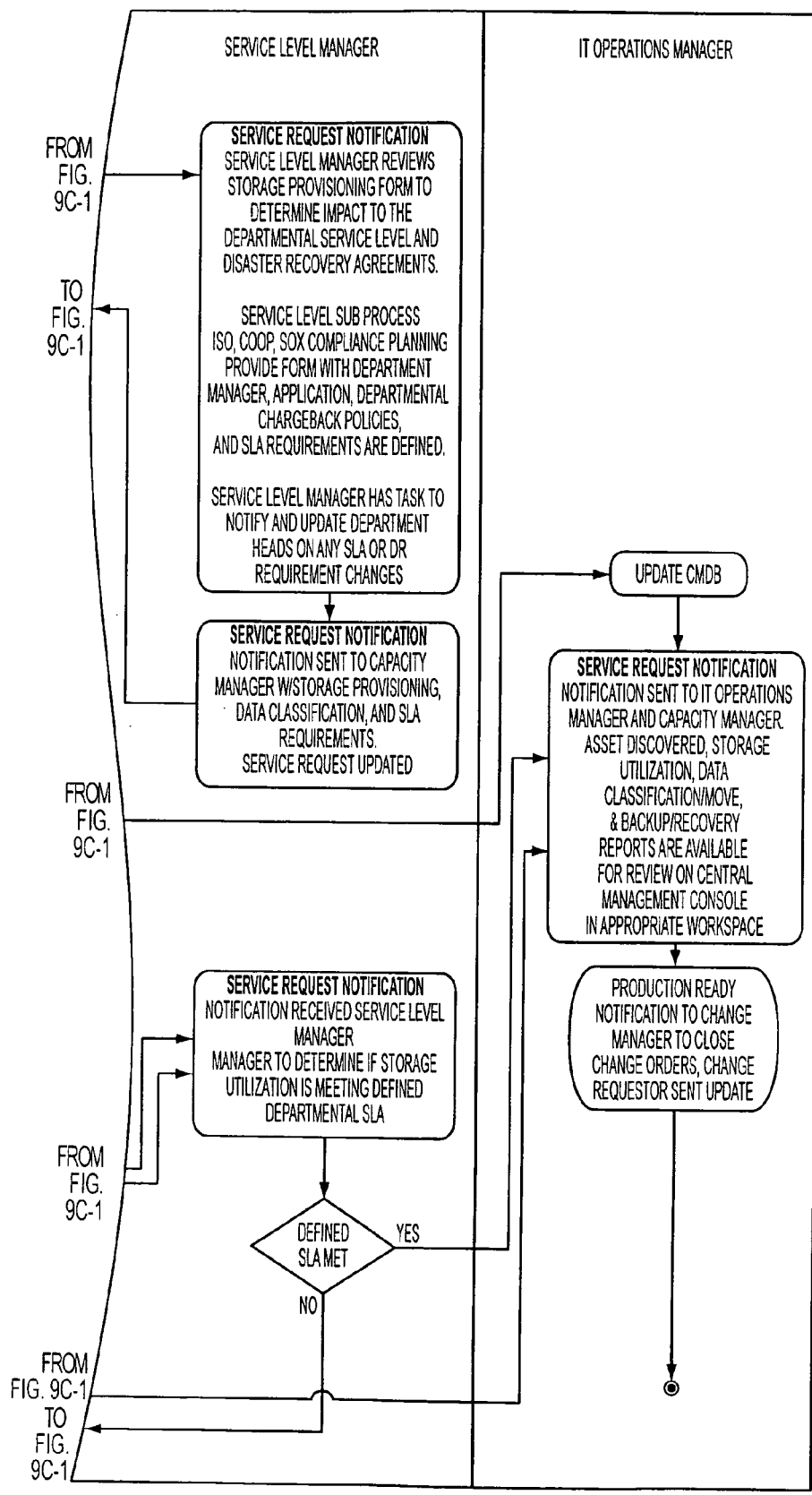

FIG. 5 illustrates a component diagram 500, which details an example of some of the components for a Responsive (level 3) to Business-Driven (level 4) storage management infrastructure. In addition to some or all of the elements discussed above regarding FIGS. 3 and 4, components of diagram 500 may also include a command center 501 (e.g., CA Storage Command Center), which provides a high-level dashboard view for the "C" level executive (e.g., CIO, CEO, etc.). Command center 501 manages storage assets across multiple data centers from local and regional office locations. Command center 501 also leverages information from the portal 301 for business analytics and storage intelligence purposes and enables information technology (IT) to better align storage to the organization's business.

The example of an Responsive to Business-Driven storage management infrastructure illustrated in FIG. 5 may also include a centralized management database 503 (CMDB) that provides a centralized storage management database where all of the information regarding storage assets will be stored. CMDB 503 is accessed by SAN manager 307, command center 501, portal 301, backup server 305, storage resource manager 309, and auto-store application 401.

Storage management maturity levels may also include specific departmental and process flow infrastructure. FIGS. 6A-1 through 6B-2 illustrate an example of a process flow for storage management infrastructure at an Active (level 1) rating, wherein newly discovered storage assets are added to the organization's infrastructure. As depicted in FIGS. 6A-1 through 6B-2, a change manager may manually initiate a discovery process which enables the new storage asset to be added to the distributed computing environment. A storage administrator locates and implements an appropriate backup or storage resource management agent or option on the discovered storage asset. A system administrator adds the discovered storage asset to the centralized backup and storage resource management application(s) that are integrated within invention. The system implemented by the invention identifies, classifies, monitors, and protects the storage asset based on departmental service level agreements which have been defined, tested. The components of storage management application (agents or options) are implemented based on the defined service level agreements by the system administrator. An information technology (IT) operations manager manually collects and reviews storage utilization reports to ensure systems are being utilized and protected on a daily basis.

FIGS. 7A-1 through 7C-2 illustrate an example of a process flow for an organization operating at an Efficient (level 2) storage management maturity level. FIGS. 7A-1 through 7C-2 provide the ability to report, monitor, secure, and protect existing or newly discovered assets. As illustrated in FIGS. 7A-1 through 7C-2 a change requester initiates change requests (e.g., new storage asset requests, storage provisioning request, or other change requests). A change manager manually initiates a discovery process and adds the storage asset to the solution. A storage administrator locates and implements the appropriate backup or storage management agent or option. A capacity manager defines a storage tier model adding the storage asset to the appropriate tier. A system administrator adds the discovered asset to centralized backup and storage resource management applications that are integrated within the distributed computing environment. The invention (e.g., storage management application) identifies, classifies, monitors, and protects the storage asset based on the departmental service level agreements which have been defined and tested by a service level manager, solutions components implemented and configured by the system administrator. A fully automated collection of storage utilization and backup reports is enabled. The reports are available and can be viewed by an IT operations manager a centralized management console (e.g., a portal). The IT operations manager analyses the data received and feeds capacity and process management policies. The IT operations manager classifies and stores data based on the level of importance and frequency of access.

In the event of a storage provisioning request, the asset manager determines if space is available in the existing storage infrastructure and notifies a capacity manager of the storage provisioning request. If the asset manager determines that the space is not available, then he or she initiates the procurement process. The capacity manager then notifies the change manager to ensure the newly allocated storage is discovered and protected according to the departmental service level agreements. A system administrator adds the discovered storage asset to the centralized backup and storage resource management applications which are integrated within the invention. The application identifies, classifies, monitors, and protects the storage asset based on the departmental service level agreements which have been defined, tested, and storage management application components are implemented based on the defined service level agreements by the system administrator. The collection of storage utilization and backup reports is fully automated. The reports are available and viewed by the IT operations manager at a centralized management console (e.g., a portal). The IT operations manager analyses data received and feeds capacity and process management. The IT operations manager classifies and stores data based on the level of importance and frequency of access.

In the event of a report or backup/recovery request, the storage administrator receives the request from an end-user. The storage administrator checks to ensure the storage asset for the request is available to perform the requested task (e.g., backup task, execution of a storage utilization report, or other task). The system administrator is notified in the event that a storage asset is not available or configured to perform the required task. The system administrator is responsible to ensure that the appropriate agent and/or option is installed on the storage asset. When complete, the system administrator notifies the storage administrator that the storage asset is now available for the requested task. If the system administrator is unable to install and configure the appropriate agent and/or option on the storage asset, the organization's incident management policy is initiated. The storage administrator is then informed on the status of the request. If the storage administrator is unable to execute or successfully generate a report or execute a backup/recovery task, the organization's incident management policy is initiated. The IT operations manager is able to view the storage utilization or backup/recovery status reports on a central management console (e.g., portal).

FIGS. 8A-1 through 8C-2 illustrate an example of a process flow for an organization operating at a "Responsive" (level 3) storage management maturity level. As illustrated in FIGS. 8A-1 through 8C-2, a change requestor initiates a change request (e.g., a new storage asset request, a storage provisioning request). An auto-discovery process adds a storage asset to the distributed computing environment. A storage administrator is notified of the new storage asset. The storage administrator locates and implements the appropriate backup or storage management agent or option. The capacity manager defines a storage tier model. The storage asset is then automatically assigned to the appropriate tier. The storage management application identifies, classifies, monitors, and protects the storage asset based on departmental service level agreements which have been defined, tested, and implemented based on the defined service level agreements by the system administrator. The system administrator then configures the storage resources so that the newly discovered asset is automatically added to centralized backup and storage management application(s) based on where it resides in the storage tier. Collection and posting to a central management console (e.g., a portal) of storage utilization and backup reports is fully automated. The reports are available and can be viewed by an IT operations manager at the centralized management console (e.g., portal), and the "C" level executive at a centralized management console (e.g., storage command center). The IT operations manager analysis of the data received now feeds the capacity and process management policies. The IT operations manager classifies and stores data based on the level of importance and frequency of access.

In the event of a storage provisioning request, the storage management solution automatically determines if the space is available in the existing storage infrastructure and notifies an asset manager of the storage provisioning request. If the requested space is not available, a procurement process is initiated. A capacity manager is notified of the storage provisioning request. Once the procurement process is complete, the capacity manager then notifies the change manager to ensure the newly allocated storage is discovered and protected according departmental service level agreements. The discovered storage asset is then automatically added to the distributed computing environment. A system administrator receives a notification of a success or failure to add the storage asset to the computing environment. If the system administrator is unable to execute or successfully complete the task the organization's incident management policy is initiated. The storage management application identifies, classifies, monitors, and protects the storage asset based on the departmental service level agreements which have been defined, tested and implemented based on the defined service level agreements by the system administrator. The collection and posting to a central management console (e.g., a portal) of storage utilization and backup reports is fully automated. The IT operations manager analyses the data received and feeds capacity and process management policies. The IT operations manager classifies and stores data based on the level of importance and frequency of access.

In the event of a report or backup/recovery request, the storage administrator receives the request from an end-user. The storage administrator checks to ensure the storage asset for the request is available to perform the requested task (e.g., backup task, execute a storage utilization report, or other task). The system administrator is notified in the event that a storage asset is not available or configured to perform the required task. The system administrator is responsible to ensure the appropriate agent and/or option is installed on the storage asset. When complete, the system administrator notifies the storage administrator that the storage asset is now available for the requested task. If the system administrator is unable to configure the storage asset, the organization's incident management policy is initiated. The storage administrator is informed of the status of the request. If the storage administrator is unable to execute or successfully complete the task, the organization's incident management policy in initiated. The IT operations manager will receive an automated event notification on successful and/or failed request.

In the event of a performance review request, a service delivery manager initiates or receives the request from an end-user. The service delivery manager notifies the change manager of the request to review the performance of a specified storage asset. The change manager ensures that the requested storage asset is available for review. If the storage asset is available for review, the system administrator is notified to make sure the storage asset is configured according to the departmental service levels agreements. A quality assurance manager will test the storage management application to ensure the appropriate reports are generated. If the test fails, the system administrator will receive a request to review the current storage management polices, making the appropriate changes to the configuration. If the test is passed, the service level manager reviews the reports to determine if the storage asset is performing according to the defined service levels. If it is determined the storage asset is performing to the defined service levels, then the IT operations manager retrieves and sends the appropriate performance reports to the requester. If the storage asset is not performing to the defined service levels, the service level manager initiates the organization's incident management process.

FIGS. 9A-1 through 9C-2 illustrate an example of a process flow for an organization operating at a "Business-Driven" (level 4) storage management maturity level. As illustrated in FIGS. 9A-1 through 9C-2, the process flow illustrated therein provides the ability to automate report creation, capacity plan, monitor, secure, classify and move data to a tiered storage model, and protect existing or newly discovered assets. All discovered assets are centrally managed from a Central Management Database (CMDB).

A change requester initiates a change request (e.g., a new storage asset request, a storage provisioning request, or other request). An auto-discovery process adds the storage asset to the distributed computing environment. A storage administrator is notified of the new storage asset. The storage administrator locates and implements the appropriate backup or storage management agent or option. A capacity manager defines a storage tier model. The storage asset is then automatically assigned to the appropriate tier. Additionally, chargeback has been defined and implemented.

Departments automatically receive monthly storage utilization reports which will include the cost of storing data on each storage tier. The storage management application identifies, classifies, monitors, and protects the storage asset based on the departmental service level agreements which have been defined, tested, and implemented based on the defined service level agreements by a system administrator. The system administrator configures the storage management solution the newly discovered asset is automatically added to centralized backup and storage management solution based on where it resides in the storage tier. The collection and posting to a central management console (e.g., a portal) of the storage utilization and backup reports is fully automated. The reports are available and can be viewed by the IT operations manager at the centralized management console (e.g., a portal), and the CxO level executive at a centralized management console (e.g., storage command center). An IT operations manager analyses data received and now feeds capacity and process management. The IT operations manager classifies and stores data based on the level of importance and frequency of access.

In the event of a storage provisioning request, the storage management application automatically determines if space is available in the existing storage infrastructure and notifies an asset manager of the storage provisioning request. If the requested space is not available, a procurement process is initiated and a capacity manager is notified of the storage provisioning request. Once the procurement process is complete, the capacity manager then notifies the change manager to ensure the newly allocated storage is discovered and protected according to departmental service agreements. The discovered storage asset is automatically added to the distributed computing environment. A system administrator receives a notification of a success or failure to add the storage asset to the distributed computing environment. If the system administrator is unable to execute or successfully complete the task, the organization's incident management policy in initiated.

The storage management application identifies, classifies, monitors, and protects the storage asset based on departmental service level agreements which have been defined, tested, and implemented based on the defined service level agreements by the system administrator. The collection and posting to the central management console (e.g., a portal) of the storage utilization and backup reports is fully automated. The IT operations manager analyses data received and feeds capacity and process management. The IT operations manager is now able to classify and store data based on the level of importance and frequency of access.

In the event of a report or backup/recovery request, a storage administrator receives the request from an end-user. The storage administrator checks to ensure the storage asset for the request is available to perform the requested task (e.g., a backup task, execute a storage utilization report). The system administrator will be notified in the event that a storage asset is not available or configured to perform the required task. The system administrator is responsible to ensure the appropriate agent and/or option is installed on the storage asset. When complete, the system administrator notifies the storage administrator that the storage asset is now available for the requested task. If the system administrator is unable to configure the storage asset the organization's incident management policy is initiated. The storage administrator is informed on the status of the request. If the storage administrator is unable to execute or successfully complete the task organization's incident management policy in initiated. The IT operations manager receives a notification on successful and or failed request.

In the event of a performance review request, a service delivery manager initiates or receives the request from an end-user. The service delivery manager notifies the change manager of the request to review the performance of a specified storage asset. The change manager ensures that the requested storage asset is available for review. If the storage asset is available for review, the system administrator is notified to make sure the storage asset is configured according to departmental service levels. A quality assurance manager will test the storage management solution to ensure the appropriate reports are generated. If the test fails the system administrator receives a request to review the current storage management polices, making the appropriate changes to the configuration. If the test completes successfully, the service level manager reviews the reports to determine if the storage asset is performing according to the defined service levels. If it is determined that the storage asset is performing to the defined service levels, then the IT operations manager retrieves and sends the appropriate performance reports to the requester. If the storage asset is not performing to the defined service levels, the service level manager initiates the organization's incident management process and the appropriate steps are taken to correct the incident.

The systems and methods of the invention are capable of being implemented in a Local Area Network (LAN) environment, a wide area network (WAN) environment as well as in various other types of environments including, for example, a Storage Area Network (SAN) environment. A SAN is a high speed storage network of shared storage devices. A SAN environment enables a plurality of storage devices to be available to all hosts on a LAN, WAN, or other network, saving valuable bandwidth on the network. Other implementations may also be used.

In one implementation the invention may include a system for optimized storage infrastructure. FIG. 10 illustrates an environment 1000, which is an example of a distributed computing environment wherein a storage management application 1001 may implement the features and functions of the invention. In one embodiment, storage management application 1001 may include one or more different modules 1013*a*-1013*n* that enable the features and functions of the invention. In some embodiments, one or more modules 1013*a*-1013*n* may include one or more management agents or options or other modules disclosed herein.

Environment 1000 includes one or more network portals 1003, one or more servers 1005, one or more workstations 1007, and one or more backup devices 1009, and/or other elements, each of which are interconnected via one or more networks 1011. In some implementations, servers 1005 and workstations 1007 may use the same or different operating systems. Workstations 1007 may include one or more desktop computers, laptop computers, mainframes, dumb terminals, or other computing stations. In some implementations, network 1011 is a LAN environment, and workstations 1007, servers 1005, and backup devices 1009 are interconnected via a LAN configuration.

In some implementations, a SAN environment may be provided. In the SAN environment, the workstations 1007 may be connected to one or more of a plurality of servers 1005 via a LAN as described above. However, in a SAN environment, servers 1005 are connected to one or more backup storage devices 1009 via network 1011. Servers 1005 may be assigned to server groups which include distributed servers, a primary server and backup storage devices. In some implementations, network 1011 may comprise a high speed network that may include a system of switches and bridges forming a part of a fiber channel network. The high speed network 1011 may be, for example, a fiber channel network, a shared SCSI system or an SSA type system. As such, the SAN may form a high speed, high bandwidth system for communicating stored data.

While the invention has been described with reference to the certain illustrated embodiments, the words that have been used herein are words of description, rather than words of limitation. Changes may be made, within the purview of the associated claims, without departing from the scope and spirit of the invention in its aspects. Although the invention has been described herein with reference to particular structures, acts, and materials, the invention is not to be limited to the particulars disclosed, but rather can be embodied in a wide variety of forms, some of which may be quite different from those of the disclosed embodiments.

What is claimed is:

1. A method for integrated, optimized data storage infrastructure performance in a distributed computing environment using a storage resource management application, comprising:
    receiving, at a storage resource management application, data regarding a plurality of storage infrastructure components of a distributed computing environment, wherein at least one of the plurality of storage infrastructure components comprises a device, and wherein at least two components of the plurality of storage infrastructure components are connected across a network;
    storing the received data regarding the storage infrastructure components in a storage management database;
    receiving a request related to data storage infrastructure performance for the distributed computing environment;
    identifying a request type for the request from one or more predefined request types, wherein the one or more predefined request types include at least a request to add a new storage asset to the distributed computing environment and a request to provision data storage space within the distributed computing environment for a specific purpose;
    associating, in the storage management database, the new storage asset or provisioned data storage space with one or more data backup and storage management agents of the distributed computing environment;
    associating, in the storage management database, the new storage asset or provisioned data storage space with one or more departmental service level agreements, such that the new storage asset or provisioned storage space is monitored relative to one or more departmental service level agreements; and
    performing the request in the distributed computing environment.

2. The method of claim 1, wherein receiving data regarding the plurality of storage infrastructure components includes an automated discovery module searching the distributed computing environment to identify storage infrastructure components that are available for distributed storage.

3. The method of claim 1, further comprising defining a storage tier model for existing storage assets in the distributed computing environment and wherein associating the new storage asset with one or more data backup and storage management agents further comprises assigning the new storage asset to a tier within the storage tier model.

4. The method of claim 3, wherein the new storage asset is associated with the one or more data backup and storage management agents based on the assigned tier within the storage tier model.

5. The method of claim 1, wherein identifying a request type further comprises determining if sufficient space to meet the request to provision data storage space exists within the distributed computing environment and initiating a procurement request when it is determined that insufficient space to meet the request to provision data storage space exists within the distributed computing environment.

6. The method of claim 1, wherein associating the new storage asset or provisioned data storage space with one or more departmental service level agreements is performed at a change management module of the storage resource management application.

7. The method of claim 1, wherein when the request is a request to add a new storage asset to the distributed computing environment a change manager initiates a discovery process to add the new asset as a component in the distributed computing environment.

8. A system for integrated, optimized data storage infrastructure performance in a distributed computing environment, comprising:
    a storage management database; and
    one or more processors providing a storage resource management application that:
        receives data regarding a plurality of storage infrastructure components of a distributed computing environment, wherein at least one of the plurality of storage infrastructure components comprises a device, and wherein at least two components of the plurality of storage infrastructure components are connected across a network,
        stores the received data regarding the storage infrastructure components in the storage management database,
        receives at least one request related to data storage infrastructure performance for the distributed computing environment,
        identifies a request type for the request from one or more predefined request types, the one or more predefined request types including at least:
            a request to add a new storage asset to the distributed computing environment, and
            a request to provision data storage space within the distributed computing environment for a specific purpose,
        associates, in the storage management database, the new storage asset or provisioned data storage space with one or more data backup and storage management agents of the distributed computing environment,
        associates, in the storage management database, the new storage asset or provisioned data storage space with one or more departmental service level agreements, such that the new storage asset or provisioned storage space is monitored relative to one or more departmental service level agreements, and
        performs the request in the distributed computing environment.

9. The system of claim 8, wherein the storage resource management application receives data regarding the plurality of storage infrastructure components by searching the distributed computing environment to identify infrastructure components that are available for distributed storage.

10. The system of claim 8, wherein the storage resource management application defines a storage tier model for existing storage assets in the distributed computing environment and assigns the new storage asset to a tier within the storage tier model.

11. The system of claim 10, wherein the new storage asset is associated with the one or more data backup and storage management agents based on the assigned tier within the storage tier model.

12. The system of claim 8, wherein the storage resource management application determines if sufficient space to meet the request to provision data storage space exists within the distributed computing environment and initiates a procurement request when it is determined that insufficient space to meet the request to provision data storage space exists within the distributed computing environment.

13. The system of claim 8, wherein the storage resource management application includes a change management module that associates the new storage asset or provisioned data storage space with one or more departmental service level agreements.

14. The system of claim 8, wherein when the request is a request to add a new storage asset to the distributed computing environment a change manager initiates a discovery process to add the new asset as a component in the distributed computing environment.

15. A method for integrated, optimized data storage infrastructure performance in a distributed computing environment using a storage resource management application, comprising:
   receiving, at a storage resource management application, data regarding a plurality of storage infrastructure components of a distributed computing environment, wherein at least one of the plurality of storage infrastructure components comprises a device, and wherein at least two components of the plurality of storage infrastructure components are connected across a network;
   storing the received data regarding the storage infrastructure components in a storage management database;
   receiving a request related to data storage infrastructure performance for the distributed computing environment;
   identifying a request type for the request from one or more predefined request types, wherein the one or more predefined request types include at least:
      a request to add a new storage asset to the distributed computing environment, the new storage asset being an infrastructure component in the distributed computing environment,
      a request to provision data storage space to one or more infrastructure components in the distributed computing environment for a specific purpose,
      a request to review the performance of one or more infrastructure components of the distributed computing environment in their current configuration,
      a request to produce a report regarding one or more metrics associated with one or more infrastructure components in the distributed computing environment,
      a request to recover information that was damaged or lost from one or more infrastructure components in the distributed computing environment, and
      a request to backup information from one or more infrastructure components in the distributed computing environment;
   identifying, from the request, one or more infrastructure components of the distributed computing environment associated with the request; and
   performing the request associated with the one or more identified infrastructure components of the distributed computing environment.

16. The method of claim 15, further comprising, when the request is a request to provision data storage space to one or more infrastructure components, determining if sufficient space to meet the request to provision data storage space exists within the distributed computing environment and initiating a procurement request when it is determined that insufficient space to meet the request to provision data storage space exists within the distributed computing environment.

17. The method of claim 15, wherein, when the request is a request to add a new storage asset to the distributed computing environment, a change manager initiates a discovery process to add the new asset as a component in the distributed computing environment.

18. The method of claim 15, further comprising, when the request is a request to review the performance one or more infrastructure components, determining whether one or more service level agreements (SLAs) are being met.

19. The method of claim 1, wherein the one or more infrastructure components include assets of the distributed computing environment capable of communicating with one another.

20. The system of claim 8, wherein the one or more infrastructure components include assets of the distributed computing environment capable of communicating with one another.

21. The method of claim 15, wherein the one or more infrastructure components include assets of the distributed computing environment capable of communicating with one another.

* * * * *